United States Patent
Iijima et al.

(10) Patent No.: US 6,236,748 B1
(45) Date of Patent: *May 22, 2001

(54) COMPOUND EYE IMAGE PICKUP DEVICE UTILIZING PLURAL IMAGE SENSORS AND PLURAL LENSES

(75) Inventors: Katsumi Iijima, Hachioji; Kotaro Yano, Yokohama; Toshiaki Kondo, Fujisawa; Katsuhiko Mori, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/509,142

(22) Filed: Jul. 31, 1995

(30) Foreign Application Priority Data

Aug. 2, 1994 (JP) .................................................. 6-181609
Dec. 9, 1994 (JP) .................................................. 6-306066

(51) Int. Cl.⁷ .................................................. G06K 9/00
(52) U.S. Cl. .................................................. 382/154; 348/47
(58) Field of Search .................................... 382/154, 153, 382/284, 285, 294; 358/540, 450; 348/42, 47, 48, 578, 580, 239

(56) References Cited

U.S. PATENT DOCUMENTS

| | | | |
|---|---|---|---|
| 4,819,064 | * | 4/1989 | Diner ..................................... 348/47 |
| 4,900,128 | * | 2/1990 | Lom ....................................... 382/154 |
| 5,450,503 | * | 9/1995 | Ogino et al. ........................... 382/194 |
| 5,499,051 | * | 3/1996 | Suda et al. .............................. 348/47 |
| 5,577,130 | * | 11/1996 | Wu ......................................... 382/154 |
| 5,585,945 | * | 12/1996 | Ikeda et al. ............................ 358/450 |

FOREIGN PATENT DOCUMENTS

| | | |
|---|---|---|
| 0330455 | 8/1989 | (EP) . |
| 0563737 | 10/1993 | (EP) . |
| 0645926 | 3/1995 | (EP) . |
| 0688133 | 12/1995 | (EP) . |
| 1-114283 | 5/1989 | (JP) . |
| 2-020988 | 1/1990 | (JP) . |

OTHER PUBLICATIONS

PCS '93, 1993 Picture Coding Symposium, Proceedings, Mar. 1993 Lusanne, Switzerland, p. 12.4/a–b, M. Ziegler and F. Seytter 'Coding of stereoscopic sequences using disparity and motion estimation' * p. 12.4B, line 1 –line 4 *.

Proceedings of Eusipco–92, Sixth European Signal Processing Conference, Aug. 1992 Brussels, Belgium, pp. 1291–1294, A. Tamtaoui and C. Labit 'Constrained motion estimators for 3DTV sequence coding' * the whole document *.

Signal Processing Image Communication, vol. 4, No. 1, Nov. 1991 Amsterdam, NE, pp. 33–43, F. Chassaing et al. 'A stereoscopic television system (3D–TV) and compatible transmission on a MAC channel (3D–MAC)' * p. 34, left column, paragraph 2.1 *.

Systems and Computers in Japan, vol. 22, No. 12, 1991 New York, US, pp. 53–64, H. Yamaguchi et al. 'Data compression and depth shape reproduction of stereoscopic images' * p. 56, left column, paragraph 3.1 *.

* cited by examiner

*Primary Examiner*—Bhavesh Mehta
(74) *Attorney, Agent, or Firm*—Fitzpatrick, Cella, Harper & Scinto

(57) ABSTRACT

For facilitating the search of corresponding points in plural images obtained from plural image pickup systems, in obtaining left and right images from left and right image pickup systems and searching two corresponding points in the two images by a corresponding point extraction unit, the search range thereof is determined according to the phototaking parameters of the image pickup systems. The paired corresponding points, thus extracted, are synthesized, in a synthesis/conversion unit, into a panoramic image or a high definition image. Thus achieved are a reduction in the search time and an improvement in the precision of search.

27 Claims, 16 Drawing Sheets

NO OBJECT REGION (CALCULATED FROM $f, \theta$ AND CCD SIZE)

COMPOUND EYE IMAGE PICKUP DEVICE UTILIZING PLURAL IMAGE SENSORS AND PLURAL LENSES

BACKGROUND OF THE INVENTION

1. Field of the Invention

The present invention relates to a compound-eye image pickup device utilizing an imaging optical system including plural image sensor devices and plural lenses.

2. Related Background Art

For the purpose of generating a wide panoramic image or a high definition image, there is recently proposed a compound-eye image pickup device provided with plural image pick-up systems, each composed of an imaging optical system and an image sensor device and adapted to take the image of a common object, whereby a synthesized image is generated from image signals obtained from the image sensor devices.

For obtaining a panoramic image, there is known a method of simultaneously taking plural images in an object field with plural image pickup systems, then extracting a same object present in different images and connecting the images based on the relative positional information of said object in the images, thereby generating a synthesized panoramic image.

Also for obtaining a high definition image, there is known a method of extracting a same object present in different images in a similar manner as in the panoramic image formation, and effecting interpolation based on the relative positional information of said object in the images, thereby generating anew a high definition image. An image pickup device based on the above-mentioned principle is provided, as shown in FIG. 1, with a left-hand side image pickup system 10L and a right-hand side image pickup system 10R which are used to take the image of an object 11, and a left image $I_L$ obtained by the left-hand side image pickup system 10L and a right image $I_R$ obtained by the right-hand side image pickup system 10R are subjected in an image processing unit 12, to extraction of corresponding points and synthesis, whereby an output image $I_{out}$ of a higher definition in comparison with the case of taking the object with a single image pickup system.

However, the above-mentioned method of obtaining the synthesized panoramic image by extracting the same object present in different images and connecting the different images based on the relative positional information of the object in the images has been associated with a drawback of requiring a very long time in acquiring the relative positional information mentioned above.

SUMMARY OF THE INVENTION

In consideration of the foregoing, a first object of the present invention is to provide a compound-eye image pickup device in which the range for searching said relative positional information is limited to a partial region of the image, based on the information on the arrangement of the image pickup device and the image taking parameters.

A second object of the present invention is to provide a compound-eye image pickup device in which the above-mentioned searching range is set, in consideration of the individual difference, for example in the image pickup parameters, of the plural image pickup systems, to a region not affected by the individual difference plus an additional region in consideration of an error resulting from the individual difference.

The above-mentioned objects can be attained, according to a preferred embodiment of the present invention, by a compound-eye image pickup device comprising plural image pickup systems, search means for searching mutually corresponding pair points from plural images obtained from the image pickup systems, and search range determination means for determining the range to be searched by said search means from image pickup parameters of the plural image pickup systems.

Also according to a preferred embodiment of the present invention, said search range determination means is adapted to set the search range by selecting a range determined from the image pickup parameters as a basic range and adding a marginal range based on the individual difference of the plural image pickup systems.

A third object of the present invention is, in effecting matching operation for synthesizing plural images, to enable determination of corresponding points in the entire area, where the corresponding points can exist, in a reference image, and to enable calculation of similarity in the entire area of the image to be searched, thereby improving the precision of extraction of corresponding points.

Still other objects of the present invention, and the features thereof, will become fully apparent from the following description, which is to be taken in conjunction with the attached drawings.

DETAILED DESCRIPTION OF THE PREFERRED EMBODIMENTS

In the following there will be explained a first embodiment of the present invention with reference to the attached drawings, and at first explained is a part from the image pickup system to the generation of a synthesized image.

Figure 1:
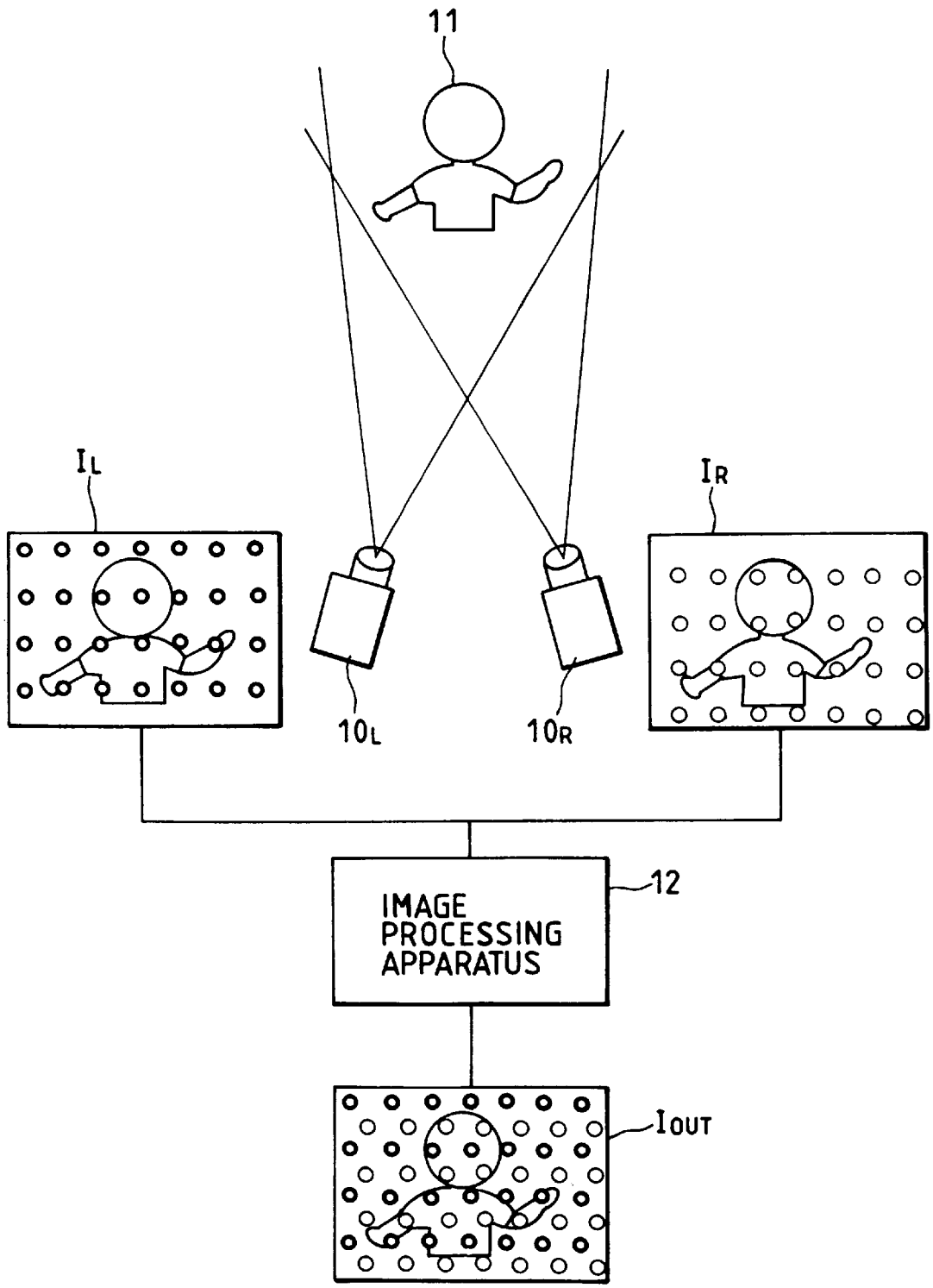
FIG. 1 is a view of a conventional compound-eye image pickup device.
Figure 2:
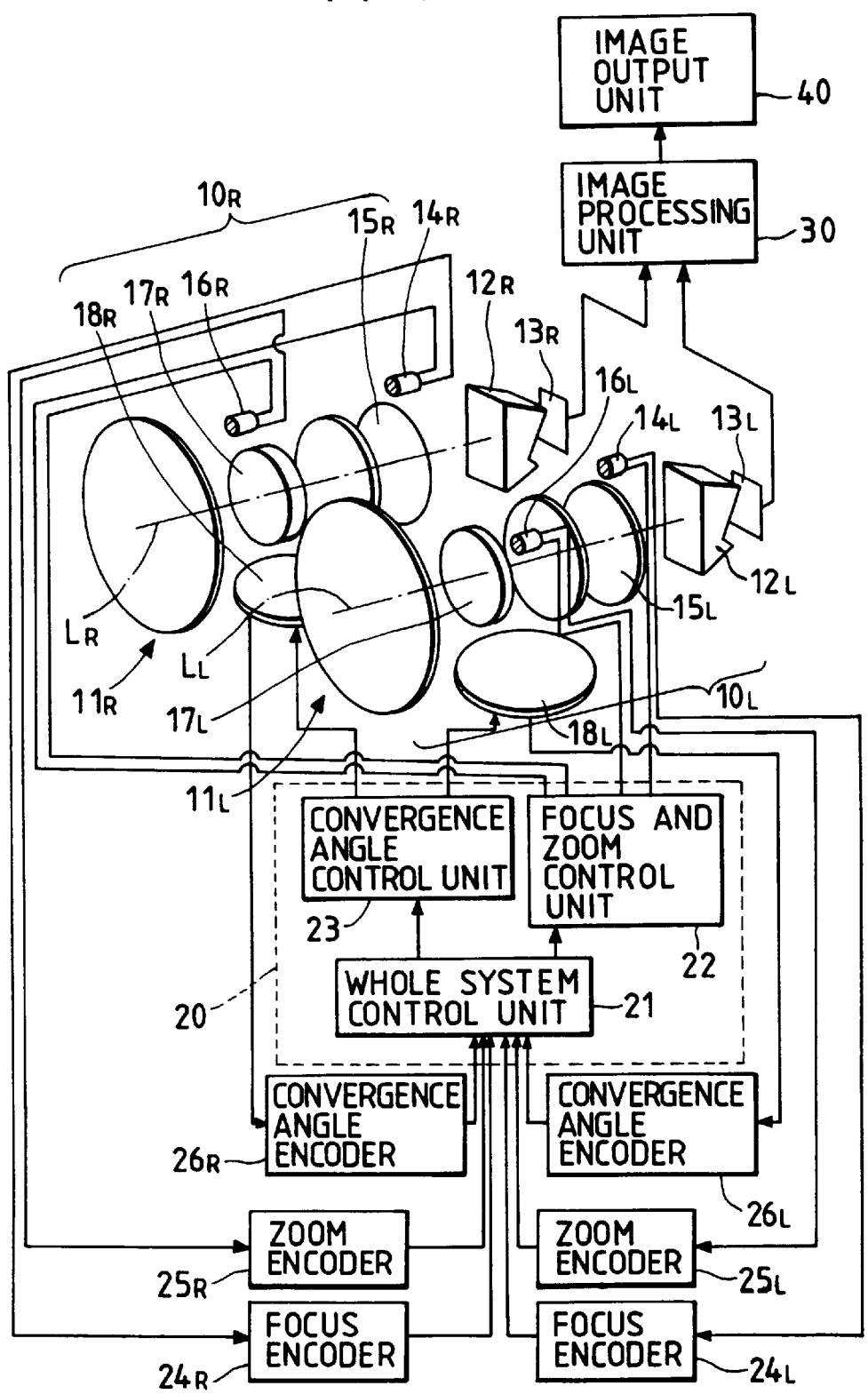
FIG. 2 is a view showing the configuration of an embodiment of the compound-eye image pickup device of the present invention.

The compound-eye image pickup device of the present embodiment is, as shown in FIG. 2, to obtain a synthesized panoramic image by parallel connection of two images, obtained by taking an object with a right-hand side image pickup system 10R and a left-hand side image pickup system 10L.

At first there will be explained the left-hand side image pickup system 10L, which is composed of a phototaking lens group 11L constituting an imaging optical system incorporated in an unrepresented lens barrel, a color-separation prism 12L mounted on said phototaking lens group 11L, for separating the light from the object into three primary colors, and three CCD image sensors 13L (only one being illustrated) provided respectively corresponding to the lights separated by the color-separation prism 12L and respectively having rectangular effective light-receiving areas. The phototaking lens group 11L is composed of plural lenses including a focusing lens group 15L driven by a focusing motor 14L and a zooming lens group 17L driven by a zooming motor 16L, and said motors 14L, 16L are driven by control signals from a system control unit 21 and a focus/zoom control unit 22 in an operation control unit 20 for controlling the optical systems.

A right-hand side image pickup system 10R is constructed similarly to the left-hand side image pickup system 10L, and the optical axis $L_R$ of the phototaking lens group 11R of said right-hand side image pickup system 10R and the optical axis $L_L$ of the phototaking lens group 11L of the left-hand side image pickup system 10L lie on a same plane.

The lens barrels incorporating said phototaking lens groups 11L, 11R are respectively connected to the rotary shafts of convergence angle motors 18L, 18R driven by control signals from a convergence angle control unit 23 of the operation control unit 20. The rotary shafts of the convergence angle motors 18L, 18R extend perpendicularly to the plane containing the optical axes $L_L$, $L_R$ of the phototaking lens group 11L, 11R, and the activation of the convergence angle motors 18L, 18R respectively rotate the phototaking lens groups 11L, 11R integrally with the color-separation prisms 12L, 12R and the CCD sensors 13L, 13R, whereby set is the mutual angle (convergence angle) of the optical axes $L_L$, $L_R$ of the phototaking lens groups 11L, 11R.

Also the image pickup systems 10L, 10R are respectively provide with focus encoders 24L, 24R for detecting the positions of the focusing lens groups 15L, 15R, zoom encoders 25L, 25R for detecting the positions of the zoom lens groups 17L, 17R, and convergence angle encoders 26L, 26R for detecting the convergence angles. These encoders may be composed of externally added devices such as potentiometers or may be so constructed as to detect the respective positions or angles by signal information provided by the driving systems themselves such as stepping motors.

Figure 3:
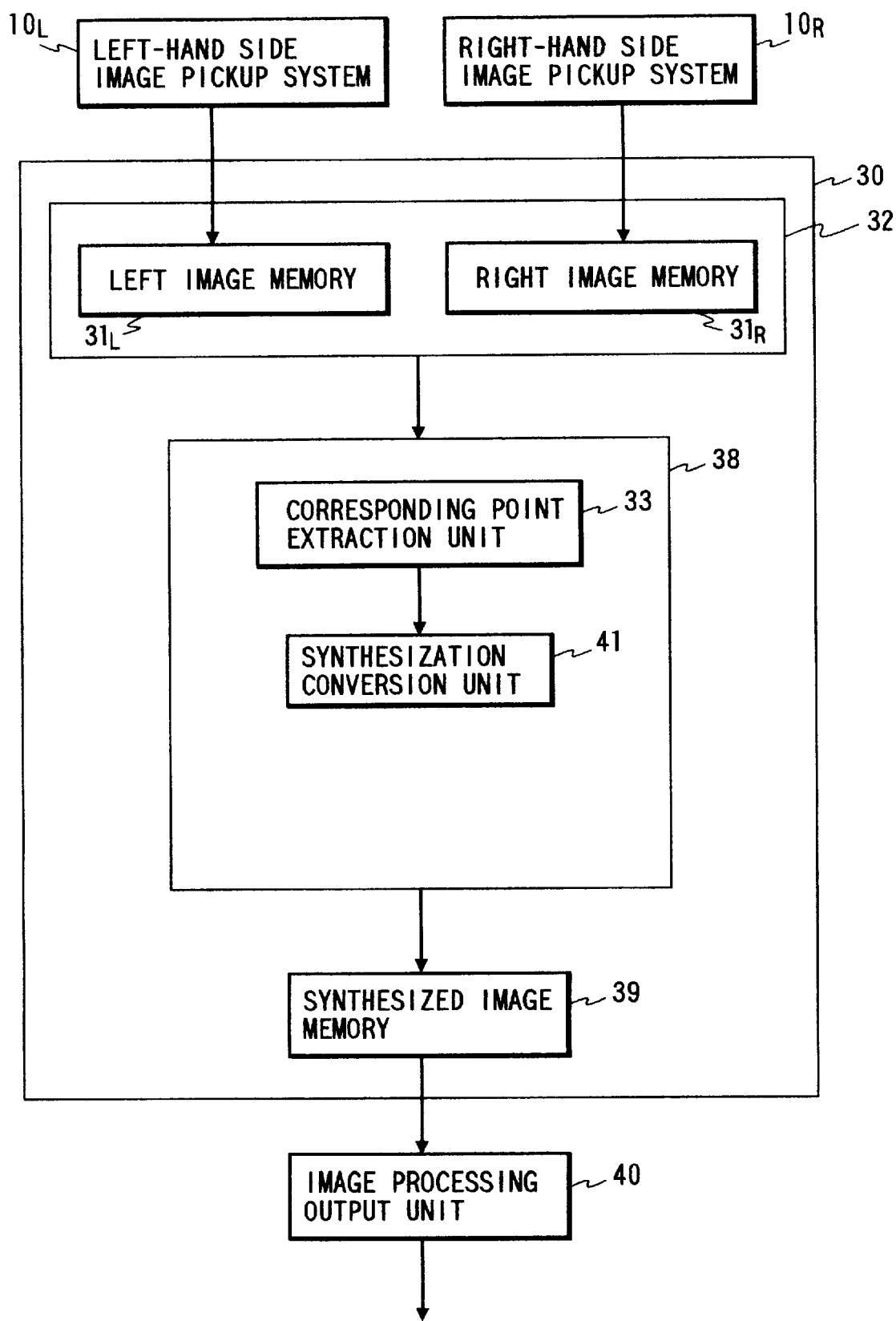
FIG. 3 is a block diagram showing the configuration of an image processing unit shown in FIG. 2.

To the CCD sensors 13L, 13R there is connected an image output unit 40 through an image processing unit 30, featuring the present invention. The image processing unit 30 is provided, as shown in FIG. 3, with an image input unit 32 consisting of a left image memory 31L and a right image memory 31R for respectively storing the image(video) signals from the CCD sensors 13L, 13R (cf. FIG. 2) of the image pickup systems 10L, 10R, an image conversion unit 38 for generating a synthesized image based on left and right images obtained from the video signals entered into the image input unit 32, and a synthesized image memory 39 for storing the image synthesized in the image conversion unit 38, for supply to the image output unit 40.

The image conversion unit 38 consists of a corresponding point extraction unit 33 for extracting paired corresponding points in the images entered into the image input unit 32, and a synthesis conversion unit 41 for calculating the three-dimensional position (distance information) of the paired corresponding points, based on the result of extraction thereof, and synthesizing an image utilizing said information.

Figure 4:
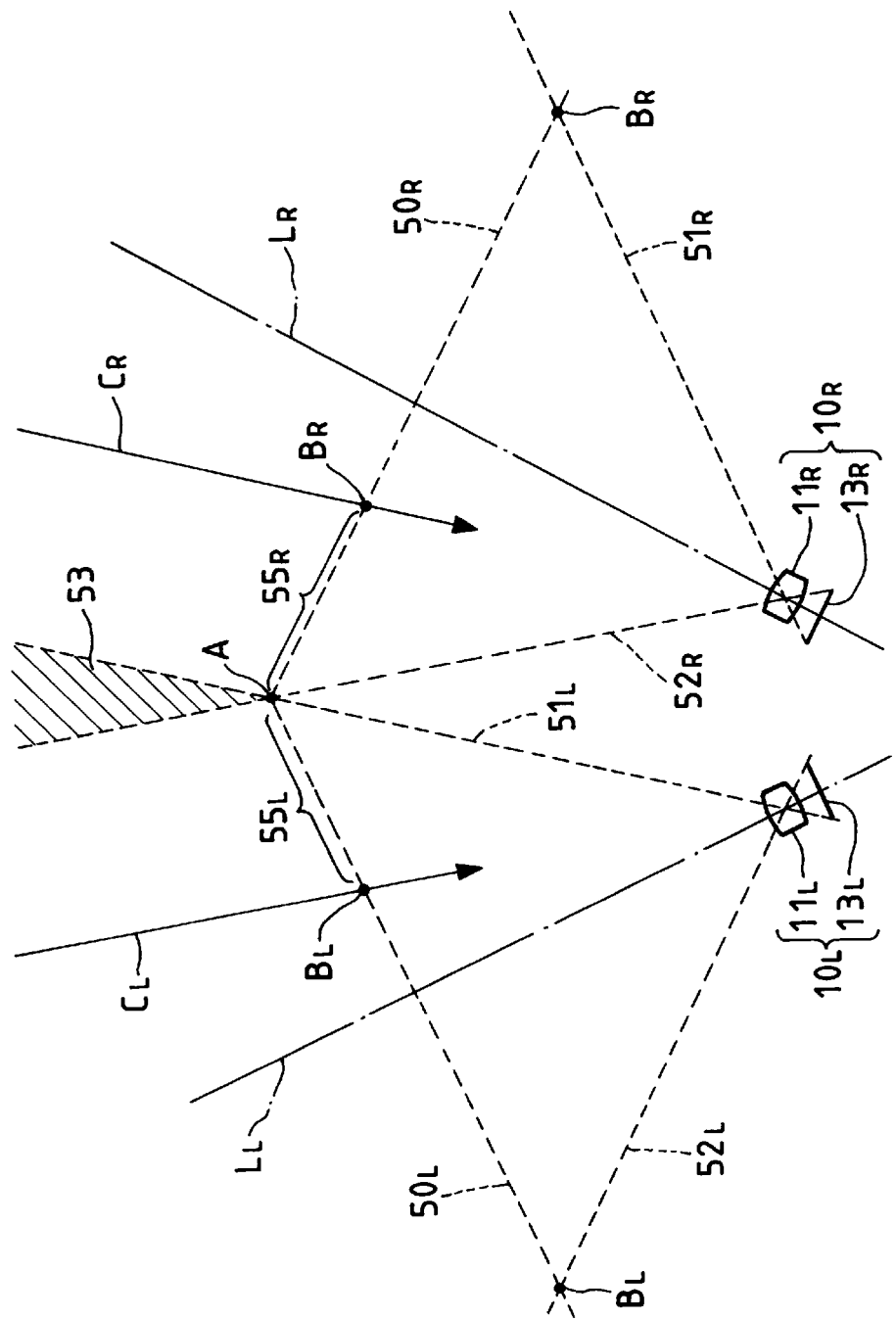
FIG. 4 is a schematic view showing the configuration of the principal part in FIG. 2.

FIG. 4 illustrates the principal part of the optical systems of the compound-eye image pickup device in FIG. 2, seen from a direction perpendicular to the plane defined by the optical axes $L_L$, $L_R$ of the phototaking lens groups 11L, 11R. For the simplification of the description, the color-separation prisms 12L, 12R (cf. FIG. 2) are omitted, and the CCD sensors 13L, 13R are illustrated in only one unit at each side. In the following there will be explained an example in which the focused planes mutually meet at the end points thereof, but such configuration is not essential in practice. As shown in FIG. 4, the phototaking lens group 11R and the CCD sensor 13R of the right-hand side image pickup system 10R have a focused object plane 50R, and the image taking is limited by the effective light-receiving area of the CCD sensor 13R into a range between lines 51R and 52R, so that an effective object field is defined on the focused object plane 50R, from a crossing point $B_R$ to a crossing point A with said lines 51R, 52R. Also for the left-hand side image pickup system 10L, an effective object: field is similarly defined on the focused object plane 50L, from the crossing point A to a crossing point $B_L$.

The focusing motors 14L, 14R (cf. FIG. 2) and the zooming motors 16L, 16R (cf. FIG. 2) of the left and right-hand side image pickup systems 10L, 10R are so controlled that the distances between the focused object planes 50L, 50R and the CCD sensors 13L, 13R and the imaging magnifications are mutually same in the left- and right-hand sides.

The motors, 14L, 14R, 16L, 16R, 18L, 18R are controlled by the operation control unit 20 (cf. FIG. 2) receiving the signals from the encoders 24L, 24R, 25L, 25R, 26L, 26R (cf. FIG. 3). In particular, the convergence angle motors 18L, 18R are controlled in relation to the positions of the focused object planes 50L, 50R and the positions of the effective-object fields, calculated from the output signals of the focus encoders 24L, 24R and the zoom encoders 25L, 25R.

Figure 5A:
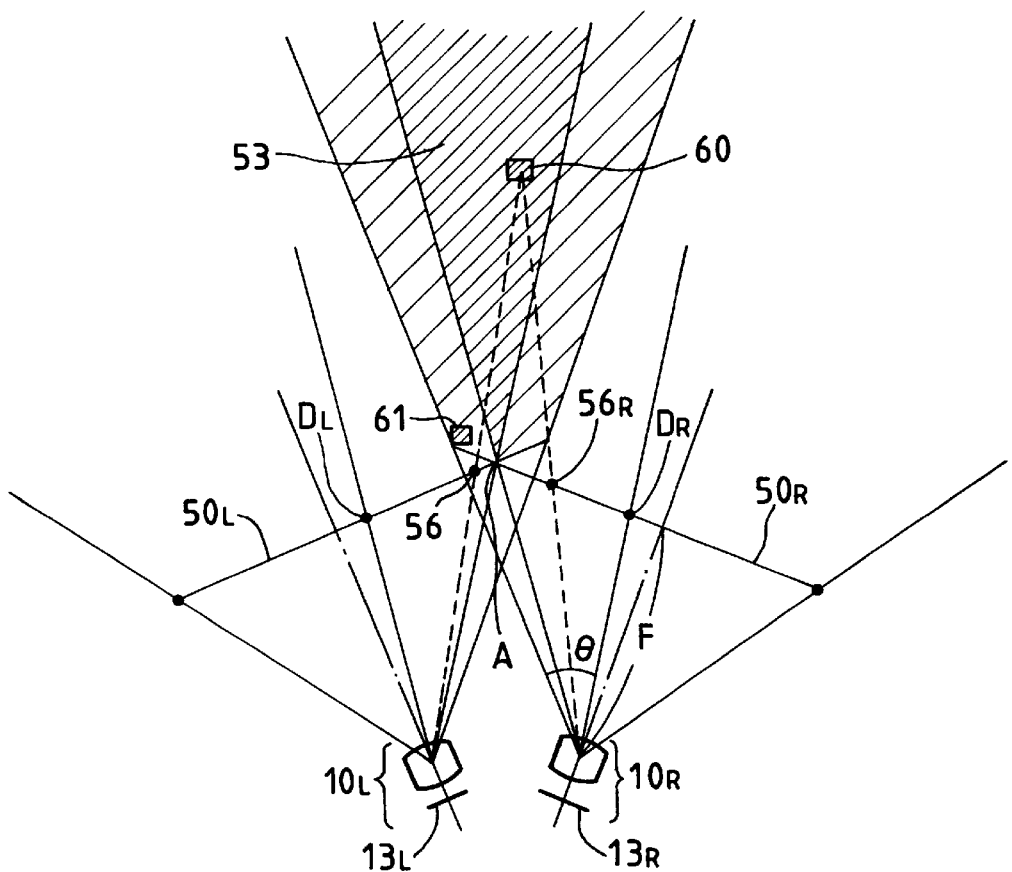
FIGS. 5A and 5B are views showing the mode of image taking.
Figure 5B:
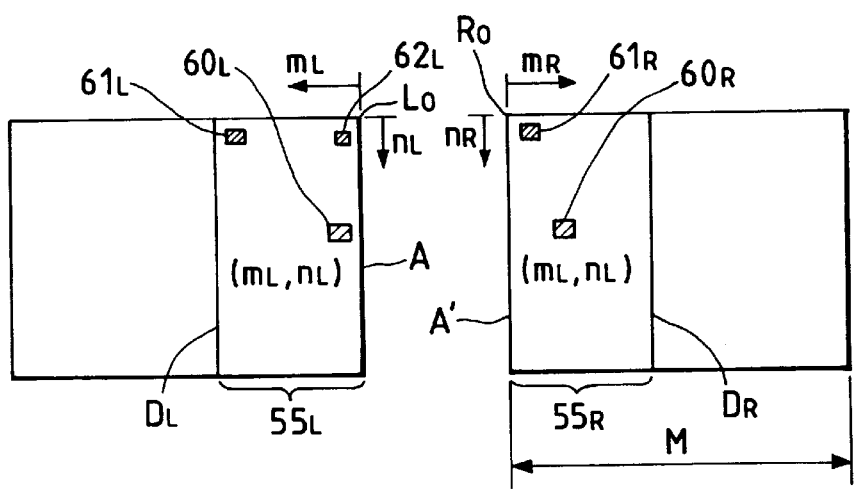

In the following there will be briefly explained the procedure of the synthesis. The corresponding point extraction unit 33 shown in FIG. 3 extracts paired corresponding points of the images. A representative method for such extraction is the template matching method. In this method there is conceived a template surrounding a point for example in the left image, and corresponding points are determined by the comparison of similarity in the right image, with respect to the image in said template. In the correlation method used for comparing the similarity, there is calculated the mutual correlation between the pixel values of the template image and those in the searched image and the corresponding point is determined at a coordinate where the mutual correlation becomes maximum, according to the following equation:

$$\sigma(m_R, n_R, m_L, n_L) = \quad (1)$$

$$\frac{\sum_{i,j} R(m_R - i, n_R - j) \cdot L(m_L + i, n_L + j)}{\sqrt{\sum_{i,j} R^2(m_R - i, n_R - j)} \cdot \sqrt{\sum_{i,j} L^2(m_L + i, n_L + j)}}$$

wherein $R(m_R, n_R)$ and $L(m_L, n_L)$ stand for the pixel values of the right and left images, and $\delta(m_R, n_R, m_L, n_L)$ indicates the level of correlation. $m_R$, $n_R$, $m_L$ and $n_L$ indicates the coordinates of the pixels. In the summations of squares or products, the sign in front of i, j is inverted in the right and left images because the coordinate axis is defined symmetrically to the right and to the left as shown in FIG. 5B. The normalized mutual correlation represented by the equation (1) has a maximum value of unity. Another known method for this purpose is the DDSA method, which is also a kind of template matching method. In this method, the remnant difference is calculated by:

$$\sigma(m_R, n_R, m_L, n_L) = \sum_i \sum_j |R(m_R - i, n_R - j) - L(m_L + i, n_L + j)| \quad (2)$$

In the course of calculation of summation, the calculation is interrupted when the remnant difference exceeds a predetermined threshold value, and the calculation proceeds to a next combination of $(m_R, n_R)$ and $(m_L, n_L)$. The threshold value is generally selected as the minimum value of the remnant difference in the past.

Based on the information on the corresponding points, there is determined the position of each pair of the corresponding points in the three-dimensional space, by a trigonometric method.

Figure 6:
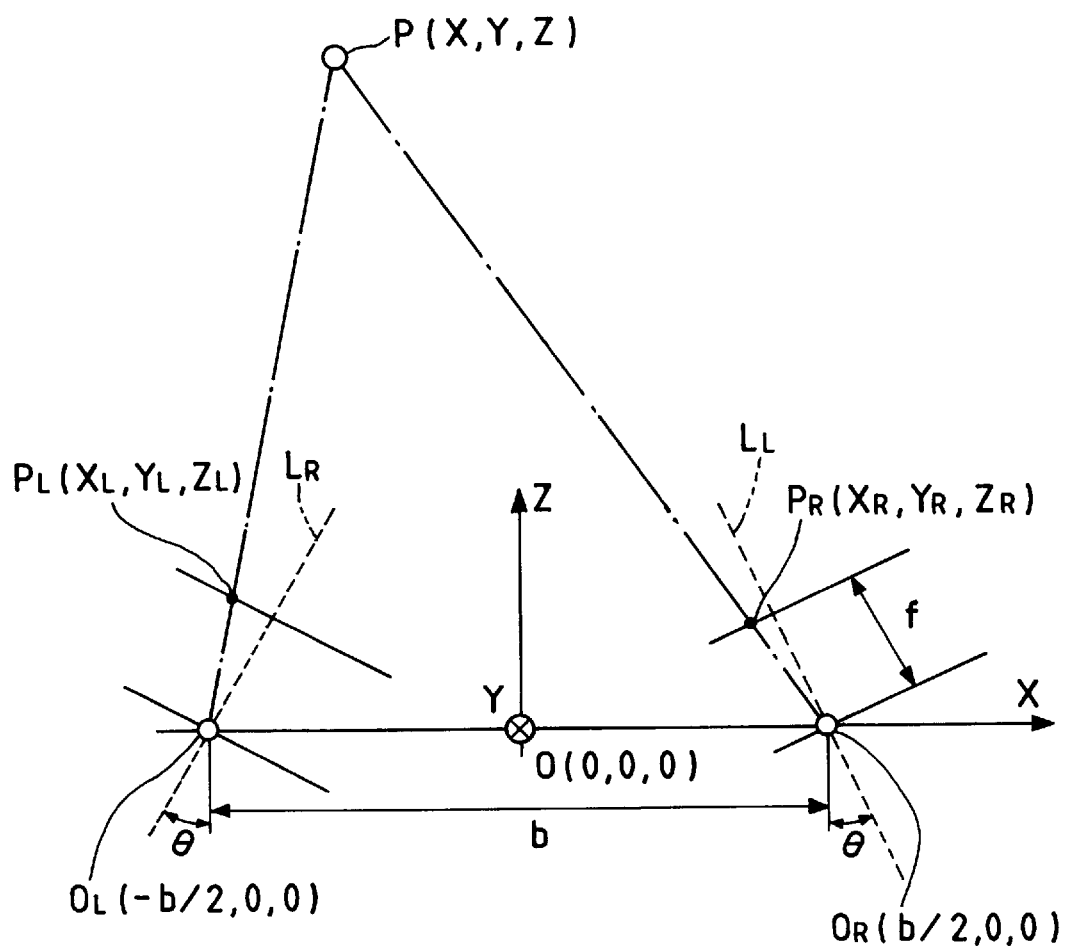
FIG. 6 is a, schematic view showing the principle of projection of an object point P on sensors.

As shown in FIG. 6, the centers $O_L$, $O_R$ of the object-side principal planes of the left and right phototaking lens groups 11L, 11R (cf. FIG. 2) are positioned on the X-axis, symmetrically with respect to the Z-axis, and the length between said centers $O_L$, $O_R$ is defined as the baseline length b. Thus said centers $O_L$ and $O_R$ are represented by coordinates (−b/2, 0, 0) and (b/2, 0, 0). It should be noted that practically, the object is picked up by the optical system shown in FIG. 2, while it is assumed in FIG. 6 for convenience that the image pickup plain is at the position $P_L$, $P_R$ in front of the lens optical system. When a point P in the three-dimensional space is projected toward the centers $O_L$, $O_R$, there are obtained projection points $P_L$, $P_R$ respectively on the left and right CCD sensors 13L, 13R. These points P, $P_L$ and $P_R$ are respectively represented by coordinates (X, Y, Z), ($X_L$, $Y_L$, $Z_L$) and ($X_R$, $Y_R$, $Z_R$).

A plane defined by the three points P, $P_L$, $P_R$ in the three-dimensional space is called an epipolar plane, and the crossing line of the epipolar plane and the sensor plane is called an epipolar line. In this relation, the coordinate (X, Y, Z) of the point P can be given by the following equations (3), (4) and (5):

$$X = (b/2) \cdot \frac{\{X_L + (b/2)\}/Z_L + \{X_R - (b/2)\}/Z_R}{\{X_L + (b/2)\}/Z_L - \{X_R - (b/2)\}/Z_R} \quad (3)$$

$$Y = \frac{Y_R}{Z_R} \cdot Z = \frac{Y_L}{Z_L} \cdot Z \quad (4)$$

$$Z = \frac{b}{\{X_L + (b/2)\}/Z_L - \{X_R - (b/2)\}/Z_R} \quad (5)$$

Also there stand following relations:

$$Z_R = \{X_R - (b/2) + f \sin(\theta)\} \tan(\theta) + f \cos(\theta) \quad (6)$$

$$Z_L = -\{X_L + (b/2) - f \sin(\theta)\} \tan(\theta) + f \cos(\theta) \quad (7)$$

wherein θ is an angle (convergence angle) of the optical axes $L_L$, $L_R$ of the left and right phototaking lens groups 11L, 11R to lines respectively passing the centers $O_L$, $O_R$ of the object-side principal planes and parallel to the Z-axis, and f is the focal length of the phototaking lens groups 11L, 11R. Thus the coordinate (X, Y, Z) of the point P can be determined from the foregoing equations. The coordinate conversion is conducted, based on the above-mentioned coordinate, to obtain an image seen from a point, for example from the middle point of the two image pickup systems.

Figure 7:
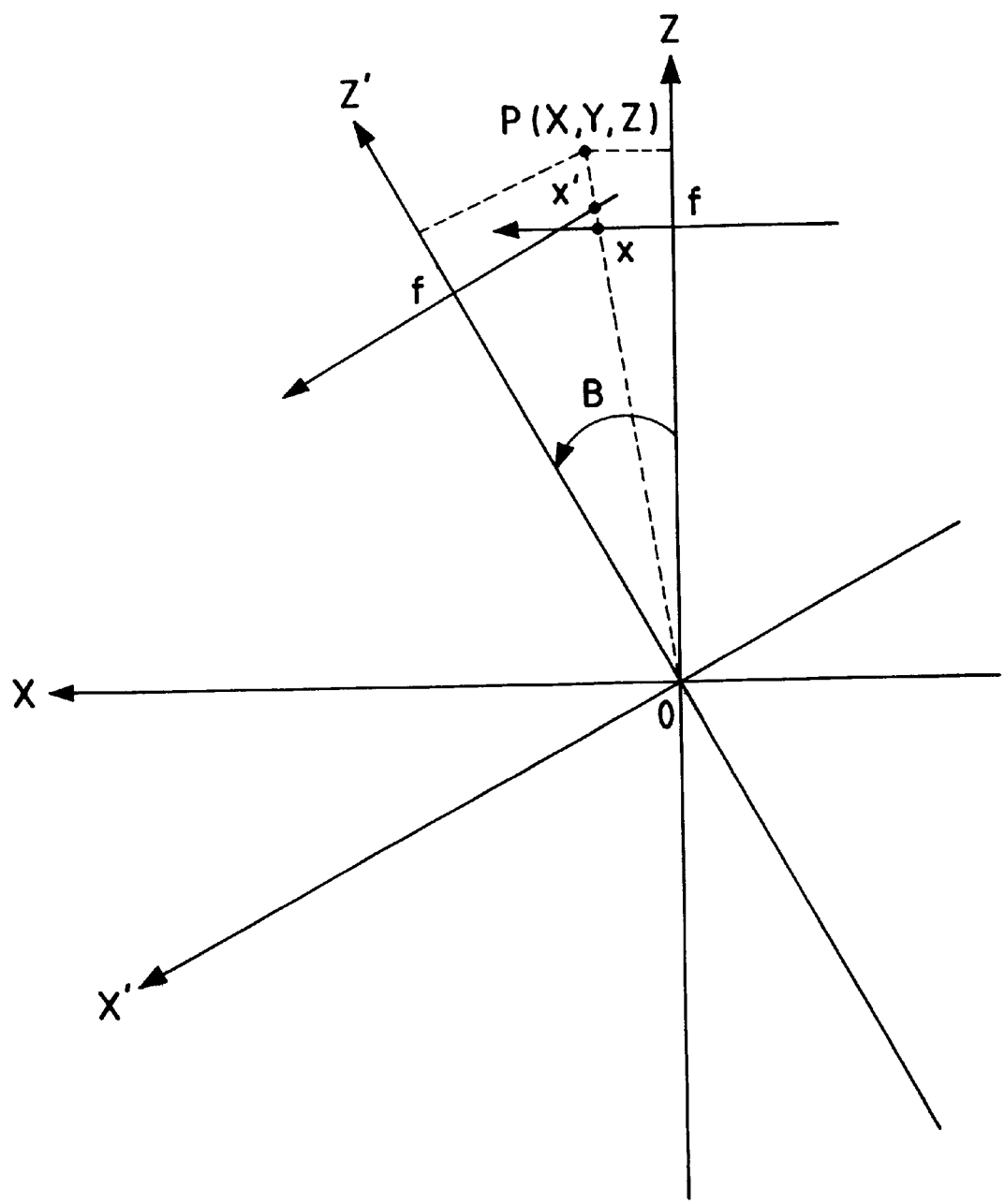
FIG. 7 is ea schematic view showing correction of convergence angle.

In the following there will be explained a conversion of the images, taken with a convergence angle as shown in FIG. 7, into images without the convergence angle, namely as if taken in the parallel state, for the purpose of determination of the search range. It should be noted that practically, the object is picked up by the optical system shown in FIG. 2, while it is assumed in FIG. 6 for convenience that the image pickup plain is at the position $P_L$, $P_R$ in front of the lens optical system.

Figure 8:
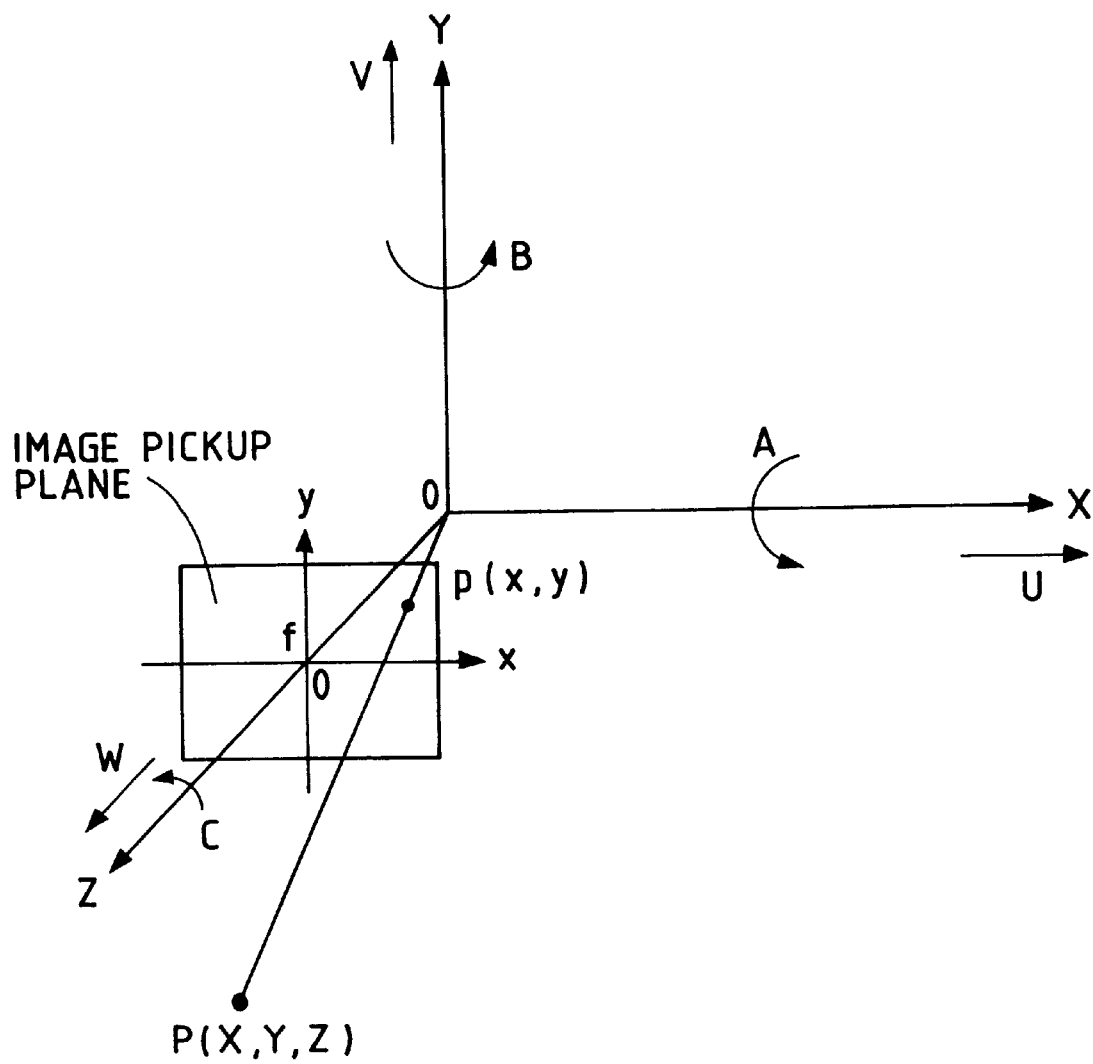
FIG. 8 is a schematic view of an image pickup plane in a world coordinate system of the right-hand image pickup system.

As shown in FIG. 8, three axes are represented by X, Y, Z; rotational motions about the three axes by A, B, C; translational motions by U, V, W; focal length by f; coordinate axes in an image pickup plane by x, g; and a point on the image pickup plane corresponding to the object point P(X, Y, Z) by p(x, y). It should be noted that practically, the object is picked up by the optical system shown in FIG. 2, while it is assumed in FIG. 6 for convenience that the image pickup plain is at the position $P_L$, $P_R$ in front of the lens optical system. In this state there stand:

$$x = f \cdot (X/Z) \quad (8)$$

$$y = f \cdot (Y/Z) \quad (9)$$

With the rotational and translational motions of the three axes, there stands:

$$\begin{pmatrix} X' \\ Y' \\ Z' \end{pmatrix} = \begin{pmatrix} 1 & 0 & 0 \\ 0 & \cos A & \sin A \\ 0 & -\sin A & \cos A \end{pmatrix} \quad (10)$$

$$\begin{pmatrix} \cos B & 0 & -\sin B \\ 0 & 1 & 0 \\ \sin B & 0 & \cos B \end{pmatrix} \begin{pmatrix} \cos C & \sin C & 0 \\ -\sin C & \cos C & 0 \\ 0 & 0 & 1 \end{pmatrix} \begin{pmatrix} X \\ Y \\ Z \end{pmatrix} - \begin{pmatrix} U \\ V \\ W \end{pmatrix}$$

wherein X', Y', Z' represent new three axes. Thus the point p(x', y') on the image pickup plane corresponding to the point P(X', Y', Z') is represented by:

$$x' = f \cdot (X'/Z') \quad (11)$$

$$y' = f \cdot (Y'/Z') \quad (12)$$

In this state, the optical flow (u, v) = (x', y') − (x, y) is represented by:

$$\begin{pmatrix} u \\ v \end{pmatrix} = \begin{pmatrix} x' \\ y' \end{pmatrix} - \begin{pmatrix} x \\ y \end{pmatrix} = f \begin{pmatrix} X'/Z' & -X/Z \\ Y'/Z' & -Y/Z \end{pmatrix} \quad (13)$$

For simplifying the explanation, by considering B only (A=C=U=W=φ), the equation (10) can be transformed as:

$$\begin{pmatrix} X' \\ Y' \\ Z' \end{pmatrix} = \begin{pmatrix} \cos B & 0 & -\sin B \\ 0 & 1 & 0 \\ \sin B & 0 & \cos B \end{pmatrix} \begin{pmatrix} X \\ Y \\ Z \end{pmatrix} \quad (14)$$

$$= \begin{pmatrix} X \cos B - Z \sin B \\ Y \\ X \sin B + Z \cos B \end{pmatrix} \quad (15)$$

By substituting these into the equation (13), there are obtained:

$$\begin{pmatrix} u \\ v \end{pmatrix} = \begin{pmatrix} -(X^2 + f^2)\sin B/(f \cos B + x \sin B) \\ yf/(x \sin B + f \cos B) - y \end{pmatrix} \quad (16)$$

$$= \begin{pmatrix} \sqrt{x^2 + f^2} \cdot \sin B/\cos(B - \alpha) \\ -y + y \cdot \cos\alpha/\cos(B - \alpha) \end{pmatrix} \quad (17)$$

wherein:

$$\alpha = \tan^{-1}(x/f) = \tan^{-1}(x/z) \quad (18)$$

Figure 9A:
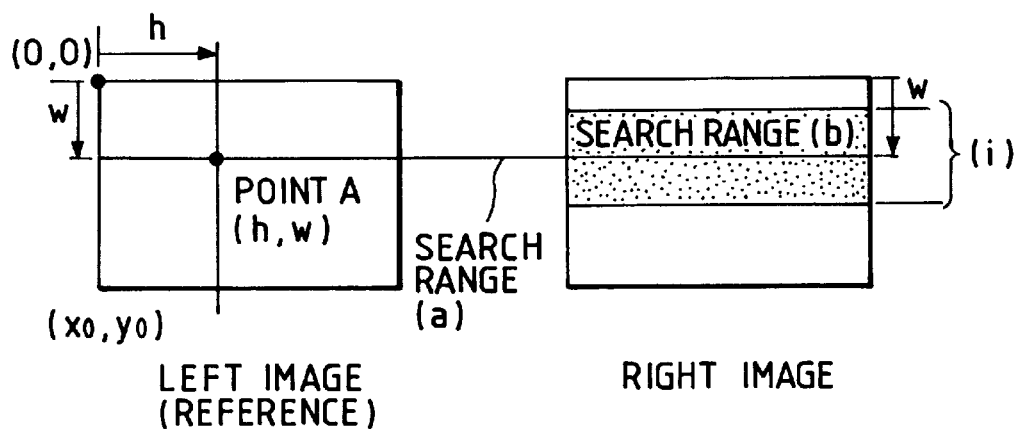
FIGS. 9A and 9B are views showing a search range in a first embodiment of the present invention.
Figure 9B:
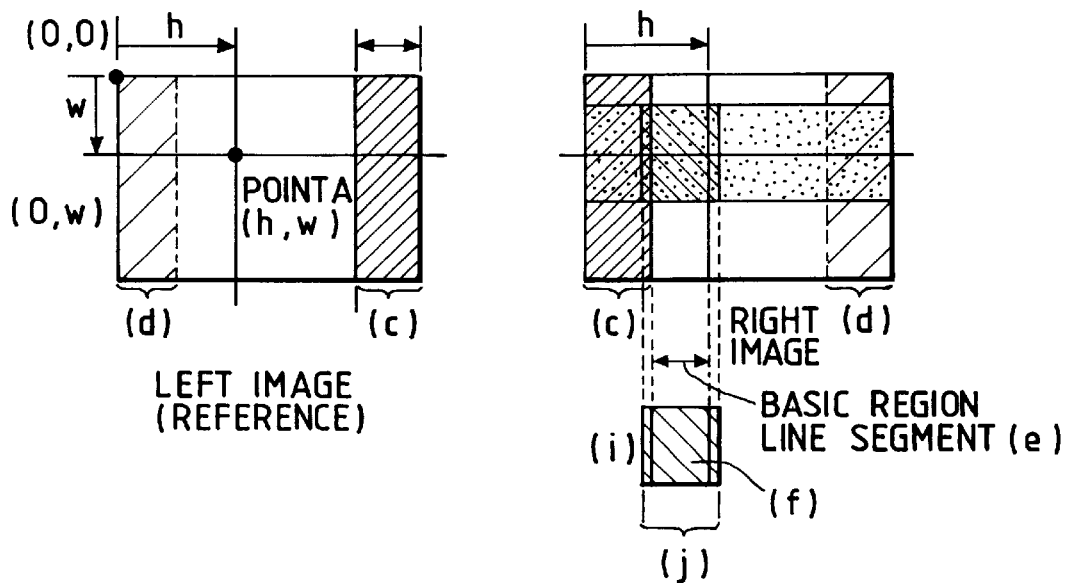

Considering B as the convergence angle, the above-explained conversion leads to the following conclusions, as indicated by the equation (17) and FIG. 7:

(1) As the images are equivalent to those obtained in parallel image pickup by the camera, the projected object points are of a same height in the two image pickup planes; and (2) Hatched areas shown in FIGS. 9A and 9B correspond to a portion where the image pickup is not conducted under the original image pickup conditions.

Based on the FIGS. 9A and 9B and the equation (17), a point $(x_0', y_0')$ corresponding to $(x_0, y_0)$ is represented by:

$$\begin{pmatrix} x_0' \\ y_0' \end{pmatrix} = \begin{pmatrix} x_0 - \sqrt{x_0^2 + f^2} \sin B/\cos(B - \alpha_0) \\ y_0 \cos\alpha/\cos(B - \alpha) \end{pmatrix} \quad (19)$$

Thus, the width (c) of the above-mentioned hatched area is given by:

$$|\sqrt{x_0^2 + f^2} \sin B/\cos(B-\alpha_0)|, \text{ wherein } \alpha_0 = \tan^{-1}(x_0/f) \quad (20)$$

In the following there is assumed:

$$G = \sqrt{x^2 + f^2} \cdot \sin B/\cos(B - \alpha_0)$$

From the foregoing conclusion (1), with respect to the vertical direction, the corresponding point for a point of a height W can be searched at the height w in the other image, as shown in FIGS. 9A and 9B, search range (a).

With respect to the horizontal direction, there are considered the foregoing conclusion (2) and the following fact.

The corresponding point to a point (h, w) in the left image is present, in the right image, in a position up to (h, w). This will be understood from a fact that, if the object point P is at an infinite distance and is projected at a position (h, w) on the left image, it will also be projected at (h, w) on the right image.

On the other hand, the hatched areas do not contain the taken images, but the points corresponding to the image from (O, W) to (G, W) in the right image should be present, if the corresponding image exists, in a portion of a same width in the left image. Consequently, a range (d) in the left image lacks the corresponding points. Thus a point (h, w) in the left image, if G<h, should have a corresponding point, in the right image, within a range from (G, W) to (h, w). There can therefore be set a basic region (e) indicating the range of the corresponding point, as shown in FIGS. 9A and 9B.

In the following there will be explained the search range determined in consideration of the above-mentioned basic region and an error in the phototaking parameters in the compound-eye image pickup device.

In the foregoing description of the compound-eye image pickup device, there has only been considered an angle B which is equal to ½ of the convergence angle, but in practice the phototaking parameters of the image pickup systems contain angles A and C in the left-hand side image pickup system and errors ΔA and ΔC in the right-hand side image pickup.

In such situation, a portion corresponding to the errors is added to the above-mentioned basic search region, by substituting these parameters into the equation (10) to derive (X', Y', Z') anew and calculating (u, v) corresponding thereto. However, since such error portion is not known, a portion in consideration of the worst errors is usually added. For example a portion (i) shown in FIG. 9A is added in the vertical direction, and, in the horizontal direction, a portion (f) of (i)×(j) as shown in FIG. 9B is added.

In the foregoing first embodiment, the extraction of the corresponding point is conducted after correction for the convergence angle of the images. In the following there will be explained an embodiment without such correction of the convergence angle.

Figure 10:
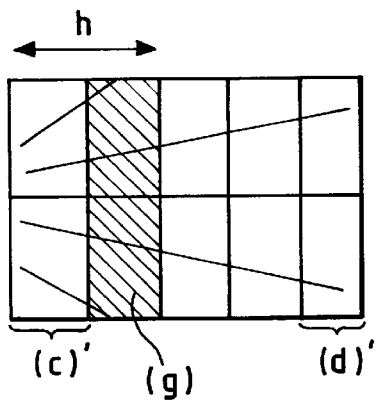
FIG. 10 is a view showing a search range in a second embodiment of the present invention.

Under the presence of a convergence angle, the epipolar lines are, in general, not mutually parallel. Consequently, in a second embodiment of the present invention, the search range in the vertical direction is selected as the entire vertical range of the image or about a half thereof. The search range in the horizontal direction is selected, according to the consideration explained in the foregoing, as a hatched area (g) in FIG. 10.

In the foregoing embodiments, in searching the corresponding points in the images obtained from plural image pickup systems, the search is not conducted over the entire image but is limited in a portion thereof according to the phototaking parameters of the image pickup system, whereby the time required for extracting the corresponding point can be significantly reduced. Also such limitation of the search range eliminates extraction of erroneous corresponding point outside said search range, thereby improving the reliability.

Also according to the foregoing embodiments, in case the plural image pickup system have individual fluctuation, the search range is determined by adding a marginal range corresponding to such individual fluctuation to the basic search range determined from the phototaking parameters, whereby the search time can be reduced even in the presence of the errors, while maintaining the reliability of the search.

In the following there will be explained a third embodiment of the present invention, providing a method for extracting corresponding points in plural images, for clarifying the correspondence between time-sequentially obtained plural images or plural images obtained from plural image pickup systems, and an image processing unit therefor.

For the ease of understanding, there will at first be explained the background of the present embodiment. The template matching method is known as a representative method for extraction of the corresponding points, for clarifying the correspondence among plural images. In this method, there is conceived a template surrounding a point, in a reference image, for which the corresponding point is to be searched, and the corresponding point is determined by calculating the similarity between said template and a range in the searched image.

Figure 11:
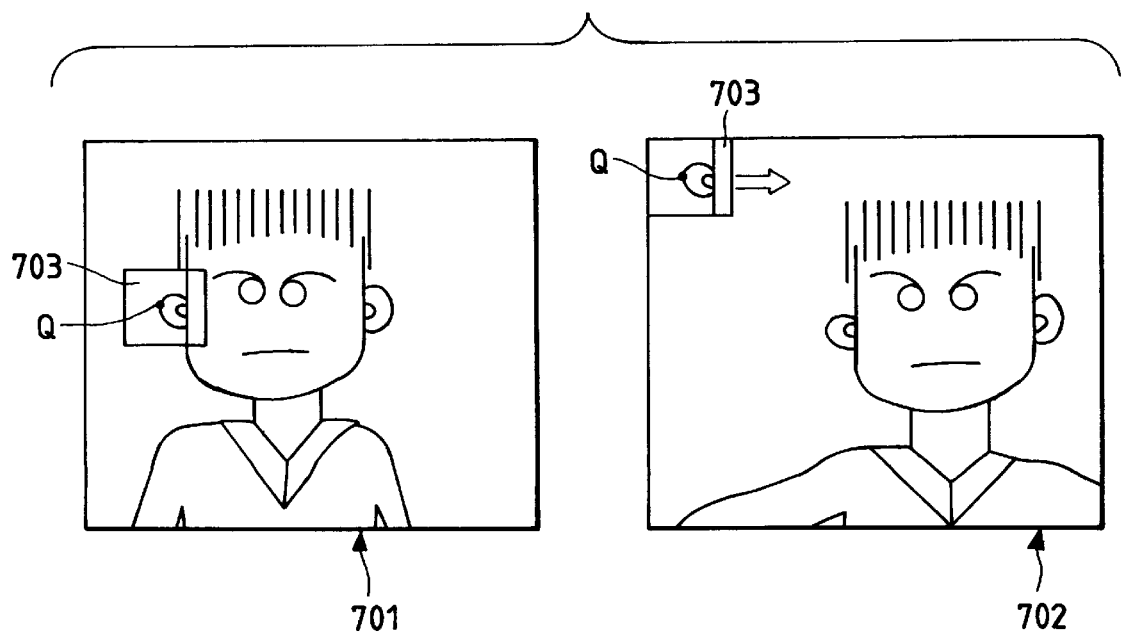
FIG. 11 is a view showing the principle of a template matching method.

Now reference is made to FIG. 11 for explaining the principle of the template matching method. As an example, in case of searching a point in a searched image 702, corresponding to a point Q on the right ear of the person in a reference image 701 shown in FIG. 11, a template 703 of a certain size around said point Q is prepared. This template 703 is moved in the searched image 702 with the calculation of similarity at each position, and the corresponding point to the point Q in the reference image 701 is determined at a position in the searched image 702 where the similarity is highest.

The similarity can be calculated, for example, utilizing the difference in pixel values as shown by the equation (21) or the correlation of pixel values as shown by the equation (22):

$$E_{(x,y)} = \sum_i \sum_j [F_{(i,j)} - A_{(i-x,j-y)}]^2 \quad (21)$$

$$\gamma_{(x,y)} = \frac{\sum \sum \{F_{(i,j)} \cdot A_{(i-x,j-y)}\}}{\sqrt{\sum \sum F_{(i,j)}^2} \sqrt{\sum \sum A_{(i-x,j-y)}^2}} \quad (22)$$

In these equations, F(i, j) indicates the searched image while A(i, j) indicates the template, and these equations provide the similarity when the template is at a position (x, y). In the calculation according to the equation (21) the corresponding point is given where E(x, y) becomes minimum, and the theoretical minimum of E(x, y) is zero. In the calculation according to the equation (22), the corresponding point is given where δ(x, y) becomes maximum, of which theoretical maximum is 1.

Figure 12:
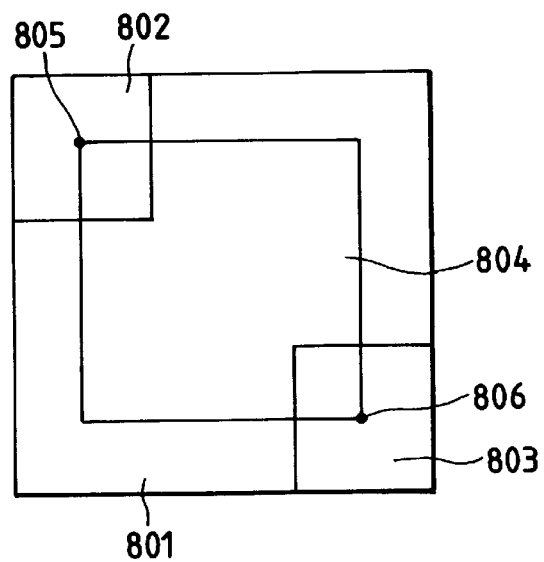
FIGS. 12 and 13 are views showing the drawback in the template matching method.

In the above-explained method, however, since the template is to be prepared around the point (805 or 806 in FIG. 12) for which the corresponding point is to be searched, the template 802 or 803 can only be prepared for the points present in a central area 804 of the reference image, and the extraction of the corresponding point cannot be achieved for the points present in the peripheral area of the reference image 801. Similarly the similarity cannot be calculated in the entire searched image but only in the central area thereof.

Figure 13:
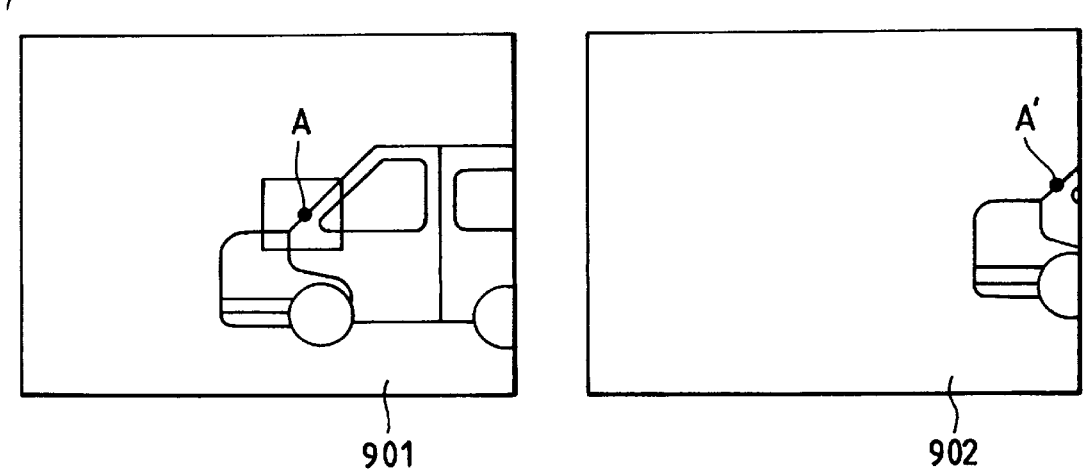

Consequently, in case the point A' corresponding to a point A in the reference image 901 is present in the peripheral area of the searched image 902 as shown in FIG. 13, the corresponding point is identified as not present or an erroneous corresponding point is extracted.

Consequently the object of the present embodiment is to provide a method for extracting corresponding points in plural images, and an image processing device therefor, enabling extraction of the corresponding point for any point in the entire reference image and also enabling calculation of similarity in the entire searched image, thereby improving the precision of extraction of the corresponding point.

The above-mentioned object can be attained, according to the present embodiment, by a method of extracting corresponding points among plural images, based on the template matching method, for clarifying the correspondence among said plural images, wherein, in extracting the corresponding points in first and second images, the area of the template is varied depending on the position of said template on said first image.

The area of the template is varied in case it is limited by the first image area in the peripheral portion thereof. Also the area of calculation is varied according to the overlapping said varied template and the second image. The calculation area is further varied in case it is limited by the second image area in the peripheral portion thereof. Furthermore a moving object can be extracted from the corresponding points extracted in the above-explained method. Also in case said first and second images are simultaneously taken with different image pickup devices, the images are subjected to epipolar conversion prior to the extraction of the corresponding points. Also there can be calculated the distance to the object, from the corresponding points extracted in the above-explained method.

Also the image processing device of the present embodiment, for clarifying the correspondence between plural images by the template matching method, comprises image input means for entering first and second images, and template varying means for varying the area of the template according to the position thereof on said first image.

Said template varying means is provided with first area limiting means for limiting the area of said template to the area of said first image, in the peripheral portion thereof. It is further provided with calculation area varying means for varying the calculation area, based on the overlapping of said template varied in area and said second image. Said calculation area varying means is provided with second area limiting means for limiting said calculation area to the area of said second image in the peripheral portion thereof. It is further provided with moving object extraction means for extracting a moving object based on the extracted corresponding points. There is further provided epipolar conversion means for effecting epipolar conversion on the images prior to the extraction of the corresponding points, in case said first and second images are taken simultaneously with different image pickup devices. There is further provided distance calculation means for calculating the distance from the extracted corresponding points to the object.

The template matching method of the above-explained configuration enables to prepare the template, for searching the corresponding point, in the entire area of the reference image, and to calculate the similarity in the entire area of the searched image.

The present embodiment will be clarified in further details with reference to the attached drawings.

Figure 15:
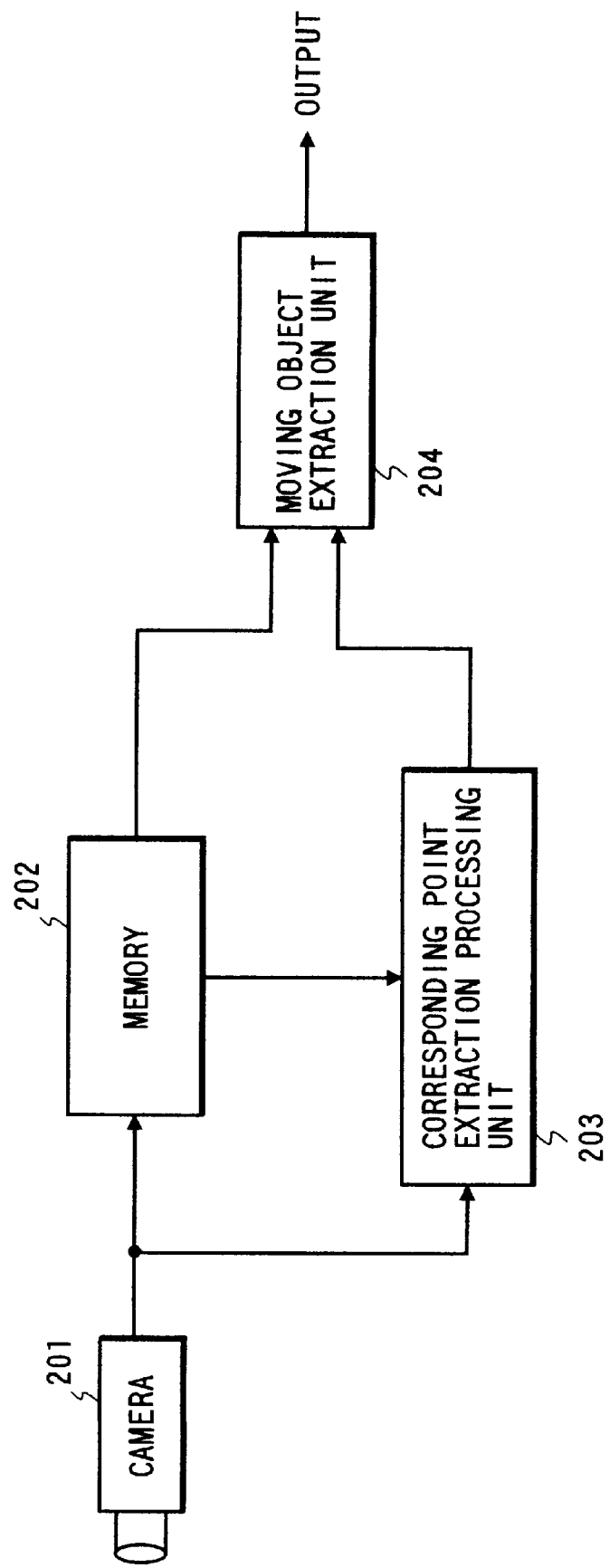
FIG. 15 is a block diagram showing a system for extracting a moving object in the third embodiment.

FIG. 15 illustrates an example of the system relating to the extraction of corresponding points in the image processing device of the third embodiment.

There are provided a camera 201 constituting an image pickup device; a memory 202 for storing the image obtained by the camera 201; a corresponding point extraction unit 203 for extracting corresponding points in the image stored in the memory 202 and an image currently obtained by the camera 201; and a moving object extraction unit 204 for extracting a moving object, based on moving vectors of the pixels, obtained by the corresponding point extraction unit 203. This system is used for precisely extracting a moving object from the image taken by the camera 201 and displaying the moving object only or cutting out the area of the moving object for the purpose of moving image compression.

The above-explained system functions in the following manner. The image entered from the camera 201 is supplied to the memory 202 and the corresponding point extraction unit 203. The memory 202 has a capacity of plural images, in order that the currently entered image is not overwritten on the previously entered image. The corresponding point extraction unit 203 effects extraction of the corresponding points in the entire area of the entered image and an immediately preceding image from the memory 202, as will be explained later. Thus the corresponding point extraction unit 203 determines movement vectors based on the immediately preceding input image. The moving object extraction unit 204 classifies the movement vectors of the pixels of the reference image, obtained in the corresponding point extraction unit 203, according to the direction and magnitude of the vectors, thus dividing the areas and extracts an area of the moving vectors, different from those of the background, as a moving object.

Figure 14A:
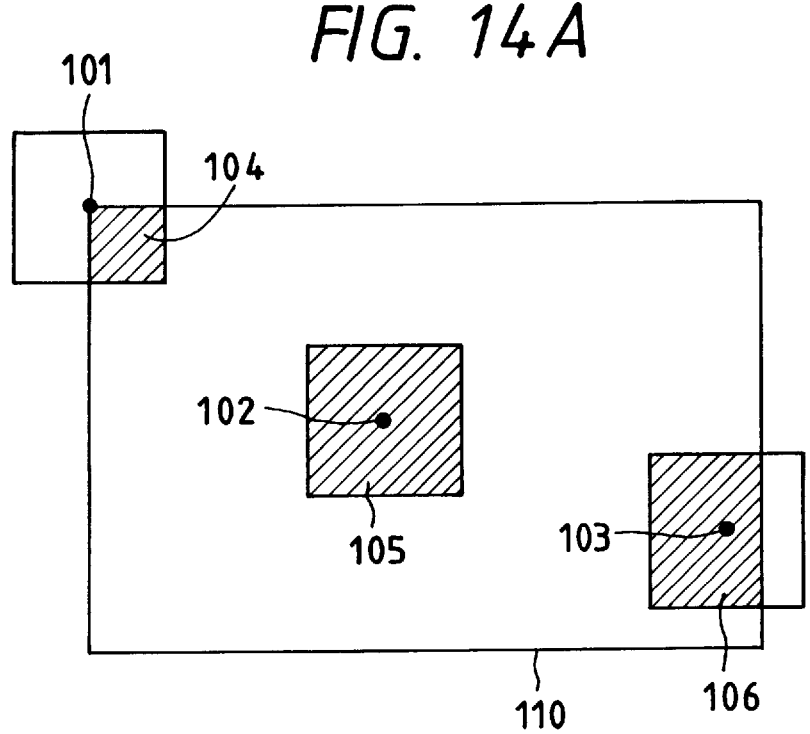
FIGS. 14A and 14B are views showing the principle of an improved template matching method of a third embodiment.
Figure 14B:
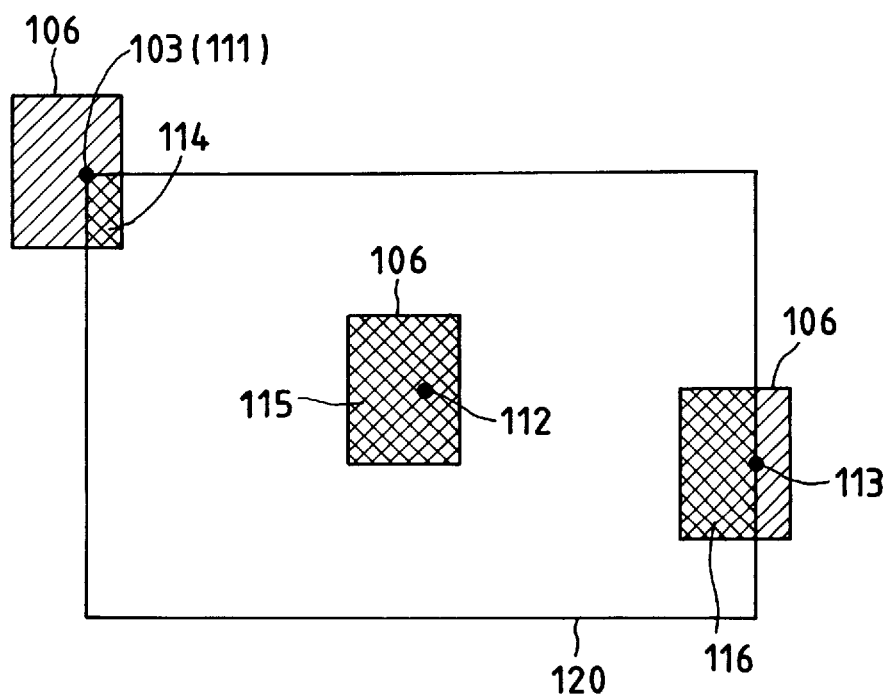

In the following there will be explained the extraction of the corresponding points in the entire reference image, executed in the corresponding point extraction unit 203. FIGS. 14A and 14B illustrate the preparation of the template in the reference image and the movement of the template in the searched image.

In FIG. 14A, hatched areas indicate templates 104–106 corresponding to points 101–103 for which the corresponding points are to be searched. If the image in FIG. 14A is taken as the reference image 110 from the memory 202, the template is prepared in the conventional manner in the central area of the reference image 110 (template 105). In the periportion of the reference image 110, an area of the same size as the template 105 in the central portion of the reference image 110 is considered about the point 101 or 103, and an overlapping portion of said area and the reference image 110 is defined as the template 104 or 106 (hatched areas in FIG. 14A).

For example, if the template of a point in the central area of the reference image 110 has a size of 7×7 pixels, the template 104 for the point 101 in FIG. 14A has a size of 4×4 pixels. Thus the template for a point, for which the corresponding point is to be searched, in the peripheral portion of the reference image 110 is different in shape and size in comparison with the temperature for the point in the central area, and the position of the point for which the corresponding point is to be searched is displaced from the center of the template.

Now reference is made to FIG. 14B for explaining the method of calculating the similarity, with the above-explained template, in a searched image 120 entered from the camera 201. As an example, the template 106 in the reference image 110 shown in FIG. 14A is used.

The point 103 for which the corresponding point is to be search is placed in succession on the points 111–113 in the search image 120 shown in FIG. 14B, whereupon overlapping between the template 106 and the searched image 120 takes place in grid-patterned areas in FIG. 14B. The similarity is calculated according to the foregoing equation (21) or (22), utilizing the pixel values in said grid-patterned areas.

If the grid-patterned area has a horizontal length $h_r$ and a vertical length $v_r$ in FIG. 14B, summation in the equation (21) or (22) is taken in a range of $h_r$ in the horizontal direction and $v_r$ in the vertical direction.

Summarizing the foregoing consideration on sizes there stand following relations, wherein h and v are maximum sizes of the template in the horizontal and vertical directions, and $h_m$ and $v_m$ are sizes of the template prepared from the reference image 110, in the horizontal and vertical directions:

$$\begin{cases} h \geq h_m \geq h_r \\ v \geq v_m \geq v_r \end{cases}$$

In case of using the equation (21), utilizing the sum of the remnant differences, in the calculation of similarity, a higher precision in the determination of the corresponding point can be achieved by employing, instead of E(x, y) for each point, the remnant different per time E'(x, y)=E(x, y)/C obtained by dividing E(x, y) with the number C of calculations used therefor.

As explained in the foregoing, a moving object can be extracted with satisfactory precision in a system provided, as shown in FIG. 15, with the corresponding point extraction unit 203 enabling to prepare the template in the entire reference image and to move the template in the entire area of the searched image. Also in contrast to the conventional moving image compression method in which the image is divided into a certain number of blocks and the moving area is extracted from such blocks, the method of the present embodiment enables precise extraction of the moving area in the unit of each pixel, thereby achieving an improvement in the compression rate and an improvement in the resolving power when the image in expanded.

The foregoing embodiment has been explained with an image taken with a camera, but this is not essential and a similar effect can also be obtained for example with an image obtained from a CD-ROM.

Figure 16:
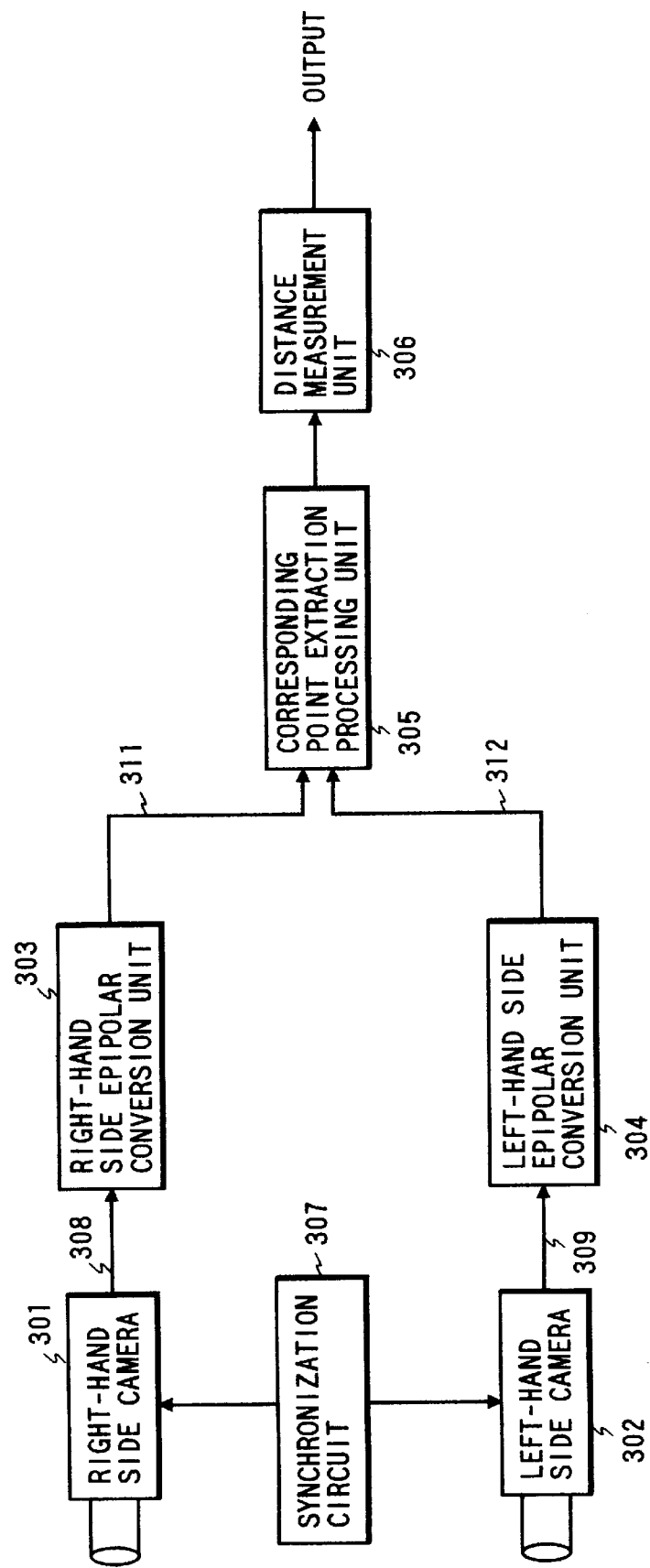
FIG. 16 is a block diagram showing a system for extracting a moving object in a fourth embodiment.

FIG. 16 shows an example of the system for extracting the corresponding points in a fourth embodiment of the image processing device, adapted for obtaining the distance distribution of the object based on images obtained from plural cameras.

There are provided a right-hand side camera 301 constituting an image pickup device; a left-hand side camera 302 constituting an image pickup device; a right-hand side epipolar conversion unit 303 for converting the image, obtained with a convergence angle by the right-hand side camera 301, into a state without convergence angle; a left-hand side epipolar conversion unit 304 of a similar function; a corresponding point extraction unit 305 for extracting the corresponding points of the images obtained by the right- and left-hand side epipolar conversion units 303, 304; a distance measurement unit 307 for calculating, by trigonometric principle, the distance distribution of the object based on the corresponding points obtained from the corresponding point extraction unit 305; and a synchronization circuit 307 for synchronizing the timing of phototaking of the cameras 301, 302.

The above-explained system functions in the following manner.

Under synchronization by the synchronization circuit 307, the right- and left-hand side cameras 301, 302 simultaneously provide a right image 308 and a left image 309, which are subjected to epipolar conversion, into a state without convergence angle, respectively by the epipolar conversion units 303, 304.

This epipolar conversion will be explained in the following.

Figure 17:
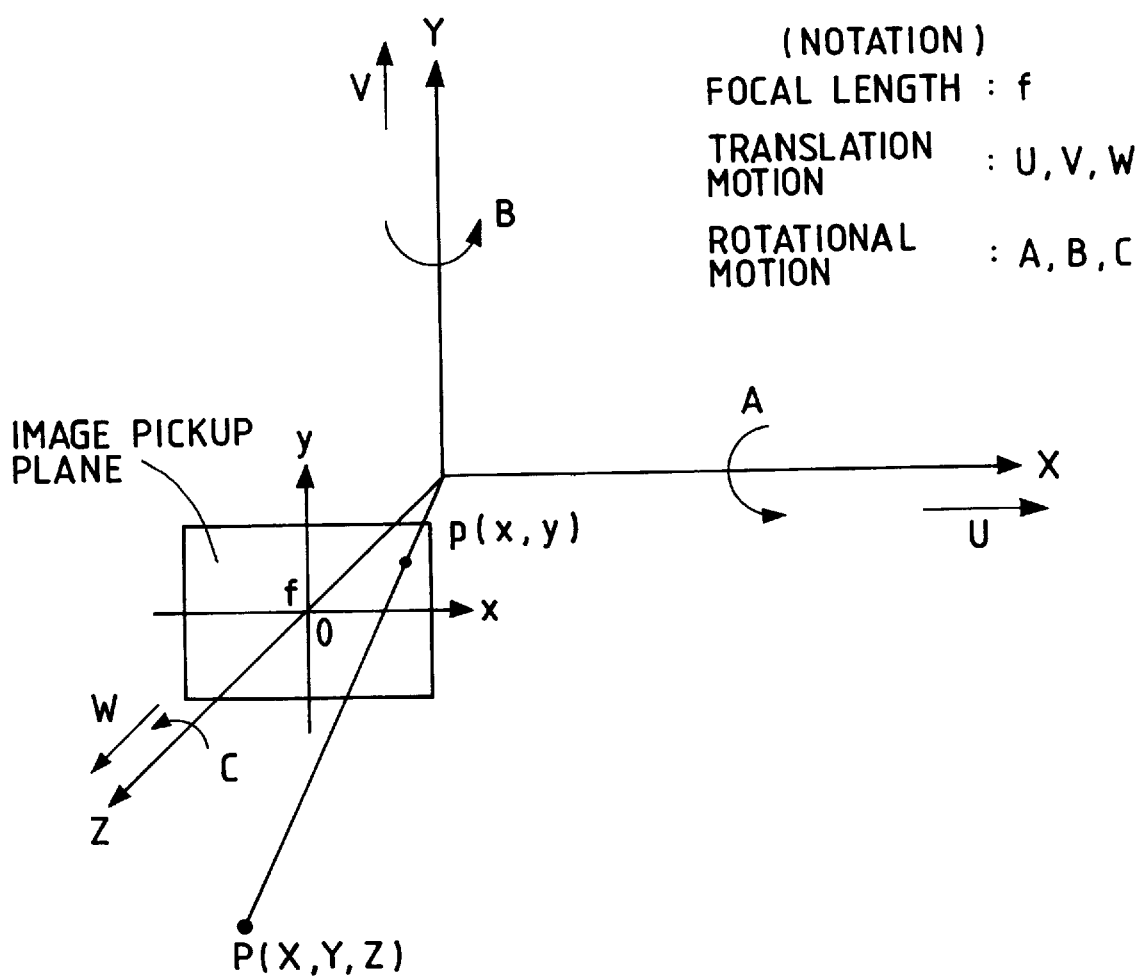
FIG. 17 is a view showing the principle of epipolar transformation.

As shown in FIG. 17, three axes are represented by X, Y, Z; rotational motions about the three axes by A, B, C; transnational motions by U, V, W; focal length by f; coordinate axes in an image pickup plane by x, y; and a point on the image pickup plane corresponding to the object point P(X, Y, Z) by p(x, y). It should be noted that practically, the object is picked up by the optical system shown in FIG. 2, while it is assumed in FIG. 6 for convenience that the image pickup plain is at the position $P_L$, $P_R$ in front of the lens optical system. In this state there stand:

$$x = f \times X/z \qquad (23)$$

$$y = f \times Y/z \qquad (24)$$

With the rotational and transnational motions of the three axes, there stands:

$$\begin{bmatrix} X' \\ Y' \\ Z' \end{bmatrix} = \begin{bmatrix} 1 & 0 & 0 \\ 0 & \cos A & \sin A \\ 0 & -\sin A & \cos A \end{bmatrix} \begin{bmatrix} \cos B & 0 & -\sin B \\ 0 & 1 & 0 \\ \sin B & 0 & \cos B \end{bmatrix} \qquad (25)$$

$$\begin{bmatrix} \cos C & \sin C & 0 \\ -\sin C & \cos C & 0 \\ 0 & 0 & 1 \end{bmatrix} \begin{bmatrix} X \\ Y \\ Z \end{bmatrix} - \begin{bmatrix} U \\ V \\ W \end{bmatrix}$$

wherein X', Y', Z' represent new three axes.

Thus the point p(x', y') on the image pickup plane corresponding to the point P(X', Y'', Z') is represented by:

$$x' = f \times X'/z \qquad (26)$$

$$y' = f \times Y'/z \qquad (27)$$

In this state, the optical flow (u, v)=(x', y')−(x, y) is represented by:

$$\begin{bmatrix} u \\ v \end{bmatrix} = \begin{bmatrix} x' \\ y' \end{bmatrix} - \begin{bmatrix} x \\ y \end{bmatrix} = f \begin{bmatrix} X'/Z' & -X/Z \\ Y'/Z' & -Y/Z \end{bmatrix} \qquad (28)$$

For simplifying the explanation, by considering B only (A=C=U=V=W=φ), the equation (25) can be transformed as:

$$\begin{bmatrix} X' \\ Y' \\ Z' \end{bmatrix} = \begin{bmatrix} \cos B & 0 & -\sin B \\ 0 & 1 & 0 \\ \sin B & 0 & \cos B \end{bmatrix} \begin{bmatrix} X \\ Y \\ Z \end{bmatrix} \qquad (29)$$

$$= \begin{bmatrix} X \cos B - Z \sin B \\ Y \\ X \sin B + Z \cos B \end{bmatrix} \qquad (30)$$

By substituting these into the equation (28), there are obtained:

$$\begin{bmatrix} u \\ v \end{bmatrix} = \begin{bmatrix} -(x^2 + f^2) \sin B / (f \cos B + x \sin B) \\ y f / (x \sin B + f \cos B) - y \end{bmatrix} \qquad (31)$$

$$= \begin{bmatrix} -\sqrt{x^2 + f^2} \cdot \sin B / \cos(B - \alpha) \\ -y + y \cdot \cos \alpha / \cos(B - \alpha) \end{bmatrix} \qquad (32)$$

wherein:

$$\alpha = \tan^{-1}(x/f) = \tan^{-1}(X/Z)$$

By considering the rotation B as the convergence angle, the epipolar conversion can be achieved by the above-written equations. Said convergence angle can be measured, for example by an encoder in the convergence angle control unit, though it is not illustrated in FIG. 17.

The corresponding points are extracted from the right-hand side epipolar image 311 and the left-hand side epipolar image 312, obtained after the above-mentioned conversion, in the corresponding point extraction unit 305. With the left-hand side epipolar image 312 as the reference image, the template can be prepared in the entire area of the reference image as in the foregoing embodiment. However the movable range of the template within the searched right-hand side epipolar image 311 is different from that in the third embodiment.

Figure 18A:
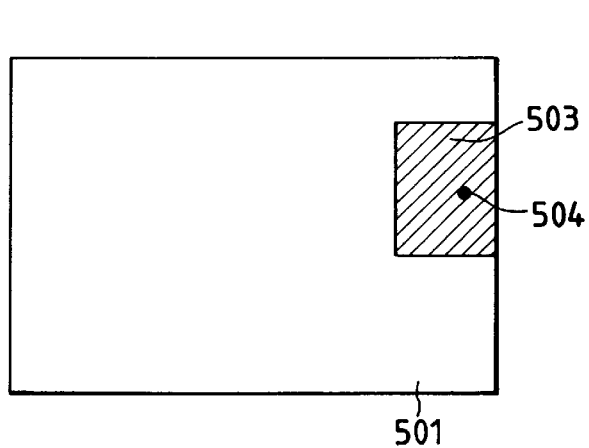
FIGS. 18A and 18B are views showing a search range in the fourth embodiment.
Figure 18B:
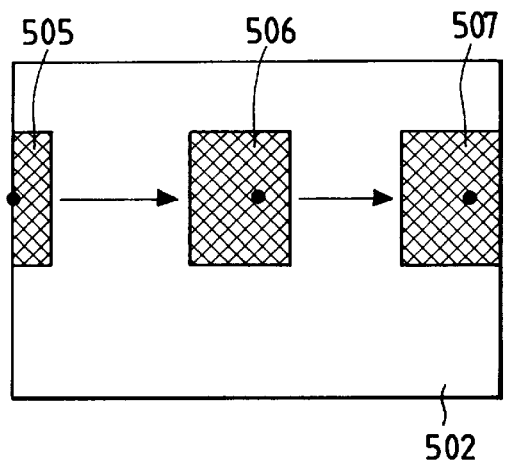

Now there will be given an explanation on the movable range. Owing to the epipolar conversion of the left and right images in the right-hand side epipolar conversion unit 303 and the left-hand side epipolar conversion unit 304, the obtained images are equivalent to those taken in a mutually parallel state. Consequently, in the vertical direction of the images, the corresponding points are present in a same height in the images. Consequently, for extracting the corresponding point of a point 504 in the reference image 501, the template 503 only needs to be moved in a single row as shown in FIGS. 18A and 18B, and the calculation area in the searched image 502 varies as 505–507.

It is also effective to effect the search in several rows, instead of a single row, in consideration of an error in the calculation or in the reading of the convergence angle.

Based on the result of extraction of the corresponding points in the entire area by the corresponding point extraction unit 305, the distance measurement unit 306 calculates the distance distribution of the object by the trigonometric method explained in the following.

Figure 19:
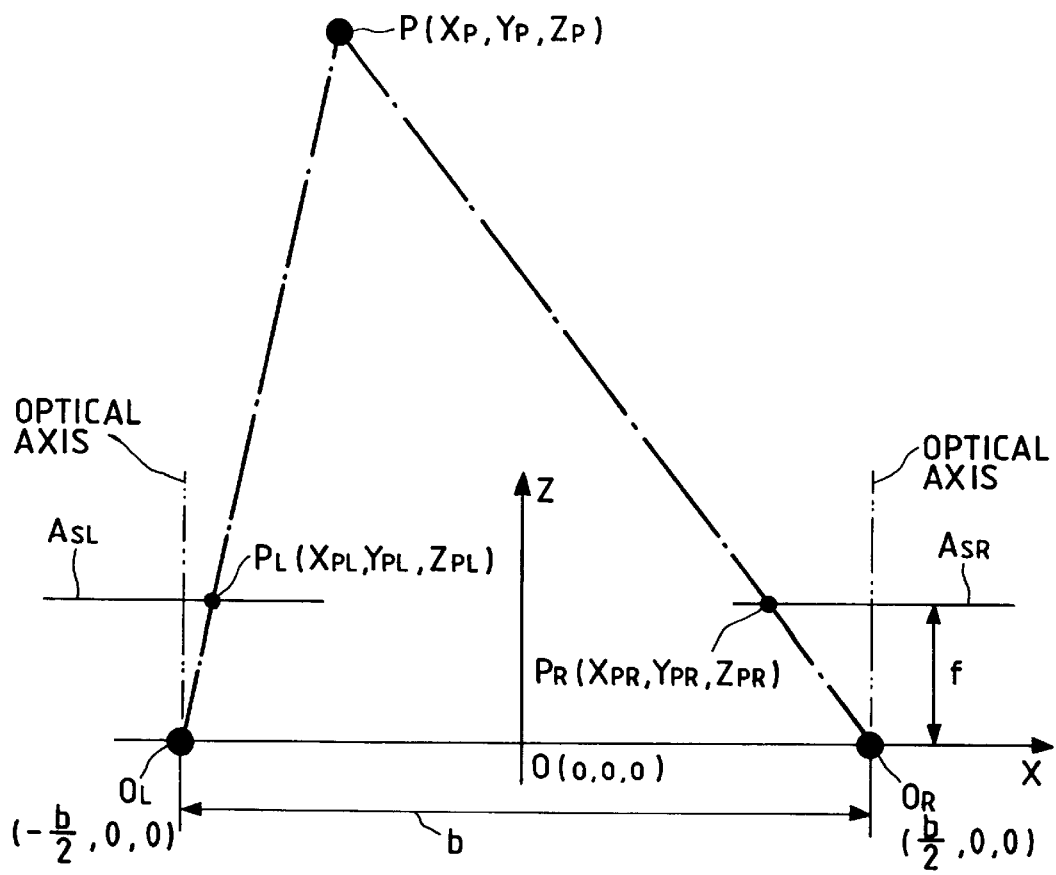
FIG. 19 is a view showing the principle of trigonometry.

As shown in FIG. 19, centers $O_L$, $O_R$ of the object-side principal planes of the left and right phototaking lens groups 301, 302 are positioned on the X-axis, symmetrically with respect to the Z-axis, and the length between said centers $O_L$, $O_R$ is defined as the baseline b, whereby the corinates of the centers $O_L$, $O_R$ are represented respectively by (−b/2, 0, 0) and (b/2, 0, 0). It should be noted that practically, the object is picked up by the optical system shown in FIG. 2, while it is assumed in FIG. 6 for convenience that the image pickup plain is at the position $P_L$, $P_R$ in front of the lens optical system.

When a point P in the three-dimensional space is projected toward the centers $O_L$, $O_R$, there are obtained projection points $P_L$, $P_R$ respectively on the left and right CCD sensors $A_{SL}$, $A_{SR}$, wherein the points P, $P_L$, $P_R$ are respectively represented by coordinates $(X_p, Y_p, Z_p)$, $(X_{PL}, Y_{PL}, Z_{PL})$, $(X_{PR}, Y_{PR}, Z_{PR})$. The object is to determine the point $P(X_p, Y_p, Z_p)$. The values $(X_{PL}, Y_{PL})$ and $(X_{PR}, Y_{PR})$ are obtained from the corresponding point extraction unit 305, and $Z_{PL}=Z_{PR}=f$ wherein f is the focal length of the lens in case the phototaking is conducted with parallel optical axes. The distance distribution can, be obtained by substituting these known value into the following three equations:

$$X_P = \frac{b}{2} \times \frac{(X_{PL} + b/2)/z_{PL} - (X_{PR} - b/2)/Z_{PR}}{(X_{PL} + b/2)/Z_{PL} + (X_{PR} - b/2)/Z_{PR}} \qquad (33)$$

$$Y_P = \frac{Y_{PR}}{Z_{PR}} \cdot Z = \frac{Y_{PL}}{Z_{PL}} \cdot Z \qquad (34)$$

$$Z_P = \frac{b}{(X_{PL} + b/2)/Z_{PL} - (X_{PR} - b/2)/Z_{PR}} \qquad (35)$$

As explained in the foregoing, the system utilizing the corresponding point extraction unit 305 capable of extracting the points corresponding to all the pixels in the reference image, as shown in FIG. 16, can provide a smooth distance distribution in the pixel level, instead of the distribution in the unit of the image block.

In the fourth embodiment, the images are subjected to epipolar conversion, but it is also possible to effect extraction of the corresponding points by moving the template in the entire area of the searched image without such epipolar conversion, as in the first embodiment.

In either case, the corresponding points can be extracted for all the pixels in the reference image.

The present invention is applicable either to a system composed of plural equipment, or to an apparatus consisting of a single equipment. It is naturally applicable also to a case where the present invention is achieved by the supply of a program to a system or an apparatus.

As explained in the foregoing embodiments, in extracting the corresponding points among plural images, the present invention enables to determine the corresponding points for the entire area, where the corresponding points are present, in the reference image, whereby the corresponding points are obtained in a larger number and at a higher density than in the conventional method and the precision of extraction of the corresponding points can-be improved.

What is claimed is:

1. An image pickup device comprising:
    plural image pickup systems;
    a search unit adapted to search paired corresponding points between plural images obtained from said plural image pickup systems in a search area set in the plural images; and
    a search range control unit adapted to detect an overlapping area between the plural images according to phototaking parameters of the plural images and to determine the range of the search area set in the overlapping area of the plural images to be searched by said search unit.

2. An image pickup device according to claim 1, wherein said search range control unit determines the search range by adding, to a basic search range determined according to said phototaking parameters, a marginal range based on the individual differences of said plural image pickup systems.

3. An image pickup device according to claim 1, wherein said search unit is based on a template matching method in which a template of an image is moved in another image and a corresponding point is extracted at a position where the correlation becomes maximum.

4. A compound-eye image pickup device according to claim 1, wherein said phototaking parameters are information on the convergence angle.

5. An image pickup device according to claim 4, wherein said phototaking parameters comprise information relating to the focal length.

6. An image pickup device according to claim 1, wherein said search range control unit determines the search range by converting images, taken in the presence of a convergence angle, into images taken without such convergence angle.

7. An image pickup device comprising:
    plural image pickup means;
    memory means for respectively storing image information taken by said plural image pickup means;
    means for determining a convergence angle of said image pickup means;
    area determination means for determining, based on the convergence angle, an area for searching corresponding points in the plural images stored in said memory means; and
    search and controlling means for correcting the area determined by said area determination means based on error information in phototaking parameters of said image pickup means and for setting the corrected area as a search range.

8. An image pickup device according to claim 7, wherein said search is based on a template matching method in which a template of an image is moved in another image and a corresponding point is extracted at a position where the correlation becomes maximum.

9. An image pickup device according to claim 8, wherein said area determination means is adapted to determine the search area by converting images, taken in the presence of a convergence angle, into images taken without such convergence angle.

10. An image pickup method for use in an image pickup device including plural image pickup systems, comprising:
    a step of searching paired corresponding points between plural images obtained from said plural image pickup systems in a search area set in said plural images; and
    a step of detecting an overlapping area between the plural images according to phototaking parameters of the plural images and determining the range of the search area set in the overlapping area of the plural images to be searched by said search step.

11. A method according to claim 10, wherein said determining step is adapted to determine the search range by adding, to a basic search range determined according to the phototaking parameters, a marginal range based on the individual difference of the plural image pickup systems.

12. A method according to claim 10, wherein said search step is based on a template matching method in which a template of an image is moved in another image and a corresponding point is extracted at a position where the correlation becomes maximum.

13. A method according to claim 10, wherein the phototaking parameters comprise information relating to the convergence angle.

14. A method according to claim 13, wherein the phototaking parameters comprise information relating to the focal length.

15. A method according to claim 10, wherein said determining step determines the search range by converting images, taken in the presence of a convergence angle, into images taken without such convergence angle.

16. An image pickup method for use in an image pickup device including plural image pickup means, comprising:
    a step of respectively storing image information taken by the plural image pickup means into memory means;
    a step of determining a convergence angle of the image pickup means,
    a step of determining, based on the convergence angle, an area for searching corresponding points in the plural images stored in the memory means; and
    a step of correcting the area determined by said area determination step based on error information in phototaking parameters of the image pickup means and for setting the correction area as a search range.

17. A method according to claim 16, wherein the search is based on a template matching method in which a template of an image is moved in another image and a corresponding point is extracted at a position where the correlation becomes maximum.

18. A method according to claim 17, wherein said area determining step is adapted to determine the search area by converting images, taken in the presence of a convergence angle, into images taken without such convergence angle.

19. A recording medium for computer-readably storing an image pickup method for use in an image pickup device including plural image pickup systems, said method comprising:
    a step of searching paired corresponding points between plural images obtained from said plural image pickup systems in a search area set in the plural images; and a step of detecting an overlapping area between the plural images according to phototaking parameters of the plural images and determining the range of the search area set in the overlapping area of the plural images to be searched by said searching step.

20. A recording medium according to claim 19, wherein said determining step determines the search range by adding, to a basic search range determined according to the phototaking parameters, a marginal range based on the individual difference of the plural image pickup systems.

21. A recording medium according to claim 19, wherein said search step is based on a template matching method in which a template of an image is moved in another image and a corresponding point is extracted at a position where the correlation becomes maximum.

22. A recording medium according to claim 19, wherein the phototaking parameters comprise information relating to the convergence angle.

23. A recording medium according to claim 22, wherein the phototaking parameters comprise information relating to the focal length.

24. A recording medium according to claim 19, wherein said determining step determines the search range by converting images, taken in the presence of a convergence angle, into images taken without such convergence angle.

25. A recording medium for computer-readably storing an image pickup method for use in an image pickup device including plural image pickup means, said method comprising:

a step of respectively storing image information taken by the plural image pickup means into memory means into memory means;

a step of determining a convergence angle of the image pickup means;

a step of determining, based on the convergence angle, an area for searching correspoding points in the plural images stored in the memory means; and a step of correcting the area determined by said determination step based on error information in phototaking parameters of the image pickup means and for setting the corrected area as a search range.

26. A recording medium according to claim 25, wherein the search is based on a template matching method in which a template of an image is moved in another image and a corresponding point is extracted at a position where the correlation becomes maximum.

27. A recording medium according to claim 26, wherein said area determination step is adapted to determine the search area by converting images, taken in the presence of a convergence angle, into images taken without such convergence angle.

* * * * *

UNITED STATES PATENT AND TRADEMARK OFFICE
CERTIFICATE OF CORRECTION

PATENT NO. : 6,236,748 B1
DATED : May 22, 2001
INVENTOR(S) : Katsumi Iijima et al.

It is certified that error appears in the above-identified patent and that said Letters Patent is hereby corrected as shown below:

Column 2,
Line 38, "ea" should read -- a --.

Column 3,
Line 46, "provide" should read -- provided --.

Column 5,
Line 11, "$\delta(m_R, n_R, m_L, n_L,)$" should read -- $\sigma(m_R, n_R, m_L, n_L,)$ --; and
Line 47, "plain" should read -- plane --.

Column 6,
Line 39, "plain" should read -- plane --.

Column 7,
Line 17, "the-equation" should read -- the equation --.

Column 8,
Line 55, "system" should read -- systems --.

Column 10,
Line 7, "said" should read -- of the --.

Column 11,
Line 50, "search" should read -- searched --.

Column 12,
Line 62, "transnational" should read -- translational --.

Column 13,
Line 1, "plain" should read -- plane --; and
Line 7, "transnational" should read -- translational --.

UNITED STATES PATENT AND TRADEMARK OFFICE
CERTIFICATE OF CORRECTION

PATENT NO. : 6,236,748 B1
DATED : May 22, 2001
INVENTOR(S) : Katsumi Iijima et al.

It is certified that error appears in the above-identified patent and that said Letters Patent is hereby corrected as shown below:

<u>Column 14,</u>
Line 28, "corinates" should read -- coordinates --; and
Line 33, "plain" should read -- plane --.

<u>Column 18,</u>
Line 2, "into memory means" should be deleted.

Signed and Sealed this

Twenty-sixth Day of February, 2002

Attest:

JAMES E. ROGAN
Attesting Officer     Director of the United States Patent and Trademark Office